US012362472B2

(12) United States Patent
McCandless et al.

(10) Patent No.: US 12,362,472 B2
(45) **Date of Patent: *Jul. 15, 2025**

(54) SWITCHABLE PATCH ANTENNA

(71) Applicant: Pivotal Commware, Inc., Bothell, WA (US)

(72) Inventors: Jay Howard McCandless, Alpine, CA (US); Eric James Black, Bothell, WA (US); Isaac Ron Bekker, Los Angeles, CA (US)

(73) Assignee: Pivotal Commware, Inc., Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,541

(22) Filed: Sep. 11, 2023

(65) Prior Publication Data

US 2024/0222858 A1 Jul. 4, 2024

Related U.S. Application Data

(63) Continuation of application No. 17/217,882, filed on Mar. 30, 2021, now Pat. No. 11,757,180, which is a (Continued)

(51) Int. Cl.
*H01Q 1/36* (2006.01)
*H01Q 1/24* (2006.01)

(Continued)

(52) U.S. Cl.
CPC ............... *H01Q 1/521* (2013.01); *H01Q 1/36* (2013.01); *H01Q 1/364* (2013.01); *H01Q 1/52* (2013.01);

(Continued)

(58) Field of Classification Search
CPC ............ H01Q 1/521; H01Q 1/36; H01Q 1/52; H01Q 1/364; H01Q 3/247; H01Q 9/04; H01Q 9/0407; H01Q 1/24; H01Q 3/24
See application file for complete search history.

(56) References Cited

U.S. PATENT DOCUMENTS 2,131,108 A 9/1938 Lindenblad
4,464,663 A 8/1984 Lalezari et al.

(Continued)

FOREIGN PATENT DOCUMENTS

AU 2019239864 B2 9/2020
AU 2020226298 A1 2/2023

(Continued)

OTHER PUBLICATIONS

Office Communication for Japan Patent Application No. JP 2021-549237 mailed Jun. 11, 2024, 5 pages including English Translation.

(Continued)

*Primary Examiner* — Hai V Tran
(74) *Attorney, Agent, or Firm* — John W. Branch; Branch Partners PLLC

(57) ABSTRACT

A switchable patch antenna comprises a planar conductor having an aperture (hole) formed in the middle of the planar conductor. Radiation of a sinusoidal signal is controlled by comparison of separate impedance values for two components that have separate impedance values. Each of the two components have one end coupled together at the terminal positioned at a center of the aperture and their other ends separately coupled to opposing edges of the aperture. A sinusoidal signal source is also coupled to the terminal positioned at the aperture's center. Further, when the impedance values of both components are substantially equivalent, radiation by the antenna of the provided signal and/or mutual coupling of other signals is disabled. Also, when an impedance value of one of the two components is substantially greater than the other impedance value of the other component, the provided signal is radiated and/or mutual coupling is enabled.

20 Claims, 10 Drawing Sheets

Related U.S. Application Data continuation of application No. 16/673,852, filed on Nov. 4, 2019, now Pat. No. 10,971,813, which is a continuation of application No. 16/280,939, filed on Feb. 20, 2019, now Pat. No. 10,468,767.

(51) Int. Cl.
*H01Q 1/52* (2006.01)
*H01Q 3/24* (2006.01)
*H01Q 9/04* (2006.01)

(52) U.S. Cl.
CPC ............... *H01Q 3/247* (2013.01); *H01Q 9/04* (2013.01); *H01Q 9/0407* (2013.01); *H01Q 1/24* (2013.01)

(56) References Cited

U.S. PATENT DOCUMENTS 6,133,880 A 10/2000 Grangeat et al.
6,150,987 A 11/2000 Sole et al.
6,529,745 B1 3/2003 Fukagawa et al.
6,680,923 B1 1/2004 Leon
7,084,815 B2 8/2006 Phillips et al.
7,205,949 B2 4/2007 Turner
8,521,080 B2 8/2013 Sakoda et al.
8,711,989 B1 4/2014 Lee et al.
9,356,356 B2 5/2016 Chang et al.
9,385,435 B2 7/2016 Bily et al.
9,450,310 B2 9/2016 Bily et al.
9,551,785 B1 1/2017 Geer
9,608,314 B1 3/2017 Kwon et al.
9,635,456 B2 4/2017 Fenichel
9,711,852 B2 7/2017 Chen et al.
9,806,414 B2 10/2017 Chen et al.
9,806,415 B2 10/2017 Chen et al.
9,806,416 B2 10/2017 Chen et al.
9,812,779 B2 11/2017 Chen et al.
9,813,141 B1 11/2017 Marupaduga et al.
9,936,365 B1 4/2018 Elam
9,955,301 B2 4/2018 Markhovsky et al.
10,014,948 B2 7/2018 Ashrafi
10,020,891 B2 7/2018 Ashrafi
10,033,109 B1 7/2018 Gummalla et al.
10,153,845 B2 12/2018 Ashrafi
10,187,156 B2 1/2019 Ashrafi
10,225,760 B1 * 3/2019 Black ........................ H01Q 9/04
10,277,338 B2 4/2019 Reial et al.
10,313,894 B1 6/2019 Desclos et al.
10,324,158 B2 6/2019 Wang et al.
10,326,203 B1 6/2019 Black et al.
10,333,217 B1 6/2019 Black et al.
10,374,710 B2 8/2019 Ashrafi
10,425,905 B1 9/2019 Black et al.
10,431,899 B2 10/2019 Bily et al.
10,468,767 B1 11/2019 McCandless et al.
10,491,303 B2 11/2019 Ashrafi
10,505,620 B2 12/2019 Ito et al.
10,522,897 B1 12/2019 Katko et al.
10,524,154 B2 12/2019 Black
10,524,216 B1 12/2019 Black et al.
10,547,386 B2 1/2020 Ashrafi
10,594,033 B1 3/2020 Black et al.
10,673,646 B1 6/2020 Shinar et al.
10,734,736 B1 * 8/2020 McCandless ........ H01Q 19/067
10,862,545 B2 12/2020 Deutsch et al.
10,863,458 B2 12/2020 Black et al.
10,971,813 B2 4/2021 McCandless et al.
10,998,642 B1 5/2021 McCandless et al.
11,026,055 B1 6/2021 Rea
11,069,975 B1 7/2021 Mason et al.
11,088,433 B2 8/2021 Katko et al.
11,190,266 B1 11/2021 Black et al.
11,252,731 B1 2/2022 Levitsky et al.
11,279,480 B1 3/2022 Rezvani
11,297,606 B2 4/2022 Machado et al.
11,374,624 B2 6/2022 Deutsch et al.
11,424,815 B2 8/2022 Black et al.
11,431,382 B2 8/2022 Deutsch et al.
11,451,287 B1 9/2022 Sivaprakasam et al.
11,463,969 B2 10/2022 Li et al.
11,497,050 B2 11/2022 Black et al.
11,563,279 B2 1/2023 McCandless et al.
11,670,849 B2 6/2023 Mason et al.
11,706,722 B2 7/2023 Black et al.
11,757,180 B2 9/2023 McCandless et al.
11,843,955 B2 12/2023 Cavcic et al.
11,844,050 B2 12/2023 Machado et al.
11,848,478 B2 12/2023 Katko et al.
11,929,822 B2 3/2024 Black
11,937,199 B2 3/2024 Katko et al.
11,968,593 B2 4/2024 Rea
11,973,568 B2 4/2024 Black et al.
12,010,703 B2 6/2024 Black et al.
2001/0005406 A1 6/2001 Mege et al.
2002/0196185 A1 12/2002 Bloy
2003/0025638 A1 2/2003 Apostolos
2003/0062963 A1 4/2003 Aikawa et al.
2003/0151103 A1 8/2003 Endo et al.
2004/0003250 A1 1/2004 Kindberg et al.
2004/0038714 A1 2/2004 Rhodes et al.
2004/0229651 A1 11/2004 Hulkkonen et al.
2005/0237265 A1 10/2005 Durham et al.
2005/0282536 A1 12/2005 McClure et al.
2006/0025072 A1 2/2006 Pan
2007/0024514 A1 2/2007 Phillips et al.
2007/0147338 A1 6/2007 Chandra et al.
2007/0184828 A1 8/2007 Majidi-Ahy
2007/0202931 A1 8/2007 Lee et al.
2008/0039012 A1 2/2008 McKay et al.
2008/0049649 A1 2/2008 Kozisek et al.
2008/0181328 A1 7/2008 Harel et al.
2009/0153407 A1 6/2009 Zhang et al.
2009/0176487 A1 7/2009 DeMarco
2009/0207091 A1 8/2009 Anagnostou et al.
2009/0231215 A1 9/2009 Taura
2009/0296938 A1 12/2009 Devanand et al.
2010/0197222 A1 8/2010 Scheucher
2010/0207823 A1 8/2010 Sakata et al.
2010/0248659 A1 9/2010 Kawabata
2010/0302112 A1 12/2010 Lindenmeier et al.
2011/0070824 A1 3/2011 Braithwaite
2011/0199279 A1 8/2011 Shen et al.
2011/0292843 A1 12/2011 Gan et al.
2012/0064841 A1 3/2012 Husted et al.
2012/0094630 A1 4/2012 Wisnewski et al.
2012/0099856 A1 4/2012 Britz et al.
2012/0194399 A1 8/2012 Bily et al.
2013/0059620 A1 3/2013 Cho
2013/0069834 A1 3/2013 Duerksen
2013/0141190 A1 6/2013 Kitaoka et al.
2013/0171986 A1 7/2013 Shimizu
2013/0231066 A1 9/2013 Zander et al.
2013/0303145 A1 11/2013 Harrang et al.
2013/0324076 A1 12/2013 Harrang
2014/0073337 A1 3/2014 Hong et al.
2014/0094217 A1 4/2014 Stafford
2014/0171811 A1 6/2014 Lin et al.
2014/0198684 A1 7/2014 Gravely et al.
2014/0266946 A1 9/2014 Bily et al.
2014/0269417 A1 9/2014 Yu et al.
2014/0293904 A1 10/2014 Dai et al.
2014/0308962 A1 10/2014 Zhang et al.
2014/0349696 A1 11/2014 Hyde et al.
2015/0109178 A1 4/2015 Hyde et al.
2015/0109181 A1 4/2015 Hyde et al.
2015/0116153 A1 4/2015 Chen et al.
2015/0131618 A1 5/2015 Chen
2015/0162658 A1 6/2015 Bowers et al.
2015/0222021 A1 8/2015 Stevenson et al.
2015/0229028 A1 8/2015 Bily et al.
2015/0236777 A1 8/2015 Akhtar et al.
2015/0276926 A1 10/2015 Bowers et al.
2015/0276928 A1 10/2015 Bowers et al.

(56) References Cited

U.S. PATENT DOCUMENTS

| | | | |
|---|---|---|---|
| 2015/0288063 | A1 | 10/2015 | Johnson et al. |
| 2015/0318618 | A1 | 11/2015 | Chen et al. |
| 2015/0372389 | A1 | 12/2015 | Chen et al. |
| 2016/0037508 | A1 | 2/2016 | Sun |
| 2016/0079672 | A1 | 3/2016 | Cerreno |
| 2016/0087334 | A1 | 3/2016 | Sayama et al. |
| 2016/0088648 | A1 | 3/2016 | Xue et al. |
| 2016/0149308 | A1 | 5/2016 | Chen et al. |
| 2016/0149309 | A1 | 5/2016 | Chen et al. |
| 2016/0149310 | A1 | 5/2016 | Chen et al. |
| 2016/0164175 | A1 | 6/2016 | Chen et al. |
| 2016/0174241 | A1 | 6/2016 | Ansari et al. |
| 2016/0198334 | A1 | 7/2016 | Bakshi et al. |
| 2016/0219539 | A1 | 7/2016 | Kim et al. |
| 2016/0241367 | A1 | 8/2016 | Irmer et al. |
| 2016/0269964 | A1 | 9/2016 | Murray |
| 2016/0302208 | A1 | 10/2016 | Sturkovich et al. |
| 2016/0345221 | A1 | 11/2016 | Axmon et al. |
| 2016/0365754 | A1 | 12/2016 | Zeine et al. |
| 2016/0373181 | A1 | 12/2016 | Black et al. |
| 2017/0033858 | A1 | 2/2017 | Calcev et al. |
| 2017/0085357 | A1 | 3/2017 | Shahar |
| 2017/0118750 | A1 | 4/2017 | Kikuma et al. |
| 2017/0127295 | A1 | 5/2017 | Black et al. |
| 2017/0127296 | A1 | 5/2017 | Gustafsson et al. |
| 2017/0127332 | A1 | 5/2017 | Axmon et al. |
| 2017/0142652 | A1 | 5/2017 | Liu et al. |
| 2017/0155192 | A1 | 6/2017 | Black et al. |
| 2017/0155193 | A1 | 6/2017 | Black et al. |
| 2017/0187123 | A1 | 6/2017 | Black et al. |
| 2017/0187426 | A1 | 6/2017 | Su et al. |
| 2017/0194704 | A1 | 7/2017 | Chawgo et al. |
| 2017/0195054 | A1 | 7/2017 | Ashrafi |
| 2017/0238141 | A1 | 8/2017 | Lindoff et al. |
| 2017/0310017 | A1 | 10/2017 | Howard |
| 2017/0339575 | A1 | 11/2017 | Kim et al. |
| 2017/0367053 | A1 | 12/2017 | Noh et al. |
| 2017/0373403 | A1 | 12/2017 | Watson |
| 2018/0013193 | A1 | 1/2018 | Olsen et al. |
| 2018/0019798 | A1 | 1/2018 | Khan et al. |
| 2018/0026683 | A1 | 1/2018 | Manholm et al. |
| 2018/0027555 | A1 | 1/2018 | Kim et al. |
| 2018/0066991 | A1 | 3/2018 | Mueller et al. |
| 2018/0076521 | A1 | 3/2018 | Mehdipour et al. |
| 2018/0097286 | A1 | 4/2018 | Black et al. |
| 2018/0123692 | A1 | 5/2018 | Leiba |
| 2018/0177461 | A1 | 6/2018 | Bell et al. |
| 2018/0219283 | A1 | 8/2018 | Wilkins et al. |
| 2018/0227035 | A1 | 8/2018 | Cheng et al. |
| 2018/0227445 | A1 | 8/2018 | Minegishi |
| 2018/0233821 | A1 | 8/2018 | Pham et al. |
| 2018/0270729 | A1 | 9/2018 | Ramachandra et al. |
| 2018/0301821 | A1 | 10/2018 | Black et al. |
| 2018/0337445 | A1 | 11/2018 | Sullivan et al. |
| 2018/0368389 | A1 | 12/2018 | Adams |
| 2019/0020107 | A1 | 1/2019 | Polehn et al. |
| 2019/0052428 | A1 | 2/2019 | Chu et al. |
| 2019/0053013 | A1 | 2/2019 | Markhovsky et al. |
| 2019/0067813 | A1 | 2/2019 | Igura |
| 2019/0115972 | A1 | 4/2019 | Braun et al. |
| 2019/0219982 | A1 | 7/2019 | Klassen et al. |
| 2019/0221931 | A1 | 7/2019 | Black et al. |
| 2019/0289482 | A1 | 9/2019 | Black |
| 2019/0289560 | A1 | 9/2019 | Black et al. |
| 2019/0336107 | A1 | 11/2019 | Hope Simpson et al. |
| 2019/0372671 | A1 | 12/2019 | Ashrafi |
| 2020/0008163 | A1 | 1/2020 | Black et al. |
| 2020/0036413 | A1 | 1/2020 | Deutsch et al. |
| 2020/0083605 | A1 | 3/2020 | Quarfoth et al. |
| 2020/0083960 | A1 | 3/2020 | Ashrafi |
| 2020/0091607 | A1 | 3/2020 | Black et al. |
| 2020/0137698 | A1 | 4/2020 | Black et al. |
| 2020/0186227 | A1 | 6/2020 | Reider et al. |
| 2020/0205012 | A1 | 6/2020 | Bengtsson et al. |
| 2020/0251802 | A1 | 8/2020 | Katko et al. |
| 2020/0259552 | A1 | 8/2020 | Ashworth |
| 2020/0266533 | A1 | 8/2020 | McCandless et al. |
| 2020/0313741 | A1 | 10/2020 | Zhu et al. |
| 2020/0366363 | A1 | 11/2020 | Li et al. |
| 2020/0403689 | A1 | 12/2020 | Rofougaran et al. |
| 2021/0036437 | A1 | 2/2021 | Zhang et al. |
| 2021/0067237 | A1 | 3/2021 | Sampath et al. |
| 2021/0159945 | A1 | 5/2021 | Deutsch et al. |
| 2021/0167819 | A1 | 6/2021 | Deutsch et al. |
| 2021/0176719 | A1 | 6/2021 | Black et al. |
| 2021/0185623 | A1 | 6/2021 | Black et al. |
| 2021/0234591 | A1 | 7/2021 | Eleftheriadis et al. |
| 2021/0313677 | A1 | 10/2021 | McCandless et al. |
| 2021/0328366 | A1 | 10/2021 | McCandless et al. |
| 2021/0328664 | A1 | 10/2021 | Schwab et al. |
| 2021/0367684 | A1 | 11/2021 | Bendinelli et al. |
| 2021/0368355 | A1 | 11/2021 | Liu et al. |
| 2021/0376912 | A1 | 12/2021 | Black et al. |
| 2022/0014933 | A1 | 1/2022 | Moon et al. |
| 2022/0038858 | A1 | 2/2022 | Rea |
| 2022/0053433 | A1 | 2/2022 | Abedini et al. |
| 2022/0078762 | A1 | 3/2022 | Machado et al. |
| 2022/0085498 | A1 | 3/2022 | Mason et al. |
| 2022/0085869 | A1 | 3/2022 | Black et al. |
| 2022/0102828 | A1 | 3/2022 | Katko et al. |
| 2022/0232396 | A1 | 7/2022 | Cavcic et al. |
| 2022/0240305 | A1 | 7/2022 | Black et al. |
| 2022/0302992 | A1 | 9/2022 | Sivaprakasam et al. |
| 2022/0369295 | A1 | 11/2022 | Machado et al. |
| 2023/0011531 | A1 | 1/2023 | Black |
| 2023/0126395 | A1 | 4/2023 | McCandless et al. |
| 2023/0155666 | A1 | 5/2023 | Black et al. |
| 2023/0164796 | A1 | 5/2023 | Black et al. |
| 2023/0337162 | A1 | 10/2023 | Katko et al. |
| 2024/0031953 | A1 | 1/2024 | Black et al. |
| 2024/0039152 | A1 | 2/2024 | Mason et al. |

FOREIGN PATENT DOCUMENTS

| | | | |
|---|---|---|---|
| AU | 2022208705 | A1 | 8/2023 |
| AU | 2022212950 | A1 | 9/2023 |
| CA | 3092509 | A1 | 9/2019 |
| CA | 3208262 | A1 | 7/2022 |
| CA | 3209376 | A1 | 8/2022 |
| CN | 102948089 | A | 2/2013 |
| CN | 103700951 | A | 4/2014 |
| CN | 106572622 | A | 4/2017 |
| CN | 106664124 | A | 5/2017 |
| CN | 106797074 | A | 5/2017 |
| CN | 109478900 | A | 3/2019 |
| CN | 110034416 | A | 7/2019 |
| CN | 110521277 | A | 11/2019 |
| CN | 111903063 | A | 11/2020 |
| EP | 3440778 | A1 | 10/2017 |
| EP | 3273629 | A1 | 1/2018 |
| EP | 3603329 | A1 | 9/2018 |
| EP | 3769429 | A1 | 9/2019 |
| EP | 3831115 | A1 | 2/2020 |
| EP | 3928380 | A1 | 8/2020 |
| EP | 3806345 | A1 | 4/2021 |
| EP | 4085494 | A1 | 7/2021 |
| EP | 4136759 | A1 | 10/2021 |
| EP | 4158796 | A1 | 12/2021 |
| EP | 4278645 | A1 | 7/2022 |
| EP | 4285628 | A1 | 8/2022 |
| EP | 3928380 | B1 | 3/2024 |
| JP | S61-1102 | A | 1/1986 |
| JP | H0936656 | A | 2/1997 |
| JP | H09214418 | A | 8/1997 |
| JP | 2000-111630 | A | 4/2000 |
| JP | 3307146 | B2 | 7/2002 |
| JP | 2003-110322 | A | 4/2003 |
| JP | 2004-270143 | A | 9/2004 |
| JP | 3600459 | B2 | 12/2004 |
| JP | 2007-081648 | A | 3/2007 |
| JP | 2007-306273 | A | 11/2007 |
| JP | 2008-153798 | A | 7/2008 |
| JP | 2009-514329 | A | 4/2009 |
| JP | 2010-226457 | A | 10/2010 |

(56) References Cited

FOREIGN PATENT DOCUMENTS

| | | | |
|---|---|---|---|
| JP | 2011-507367 | A | 3/2011 |
| JP | 2011-508994 | A | 3/2011 |
| JP | 2012-175189 | A | 9/2012 |
| JP | 2013-539949 | A | 10/2013 |
| JP | 2014-075788 | A | 4/2014 |
| JP | 2014-207626 | A | 10/2014 |
| JP | 2014-531826 | A1 | 11/2014 |
| JP | 2016-139965 | A | 8/2016 |
| JP | 2017-220825 | A | 12/2017 |
| JP | 2018-014713 | A | 1/2018 |
| JP | 2018-173921 | A | 11/2018 |
| JP | 2019-518355 | A | 6/2019 |
| JP | 2020-515162 | A | 5/2020 |
| JP | 2020-523863 | A | 8/2020 |
| JP | 2020-145614 | A | 9/2020 |
| JP | 2021-517406 | A | 7/2021 |
| JP | 2021-532683 | A | 11/2021 |
| JP | 2022-521286 | A | 4/2022 |
| JP | 2023-519067 | A | 5/2023 |
| JP | 2023-522640 | A | 5/2023 |
| JP | 2023-527384 | A | 6/2023 |
| JP | 7378414 | B2 | 11/2023 |
| JP | 2024-504621 | A | 2/2024 |
| JP | 2024-505881 | A | 2/2024 |
| JP | 7451491 | B2 | 3/2024 |
| KR | 10-2004-0006000 | A | 1/2004 |
| KR | 10-2006-0031895 | A | 4/2006 |
| KR | 10-2006-0048953 | A | 5/2006 |
| KR | 10-2008-0093257 | A | 10/2008 |
| KR | 10-2013-0080008 | A | 7/2013 |
| KR | 10-2016-0072062 | A | 6/2016 |
| KR | 10-2016-0113100 | A | 9/2016 |
| KR | 10-2019-0010545 | A | 1/2019 |
| KR | 10-2019-0133194 | A | 12/2019 |
| KR | 10-2020-0123254 | A | 10/2020 |
| KR | 10-2021-0048499 | A | 5/2021 |
| KR | 10-2021-0125579 | A | 10/2021 |
| KR | 10-2022-0129570 | A | 9/2022 |
| KR | 10-2023-0009895 | A | 1/2023 |
| KR | 10-2023-0017280 | A | 2/2023 |
| KR | 10-2023-0150811 | A | 10/2023 |
| | 2023-10-31 | | |
| KR | 10-2640129 | B1 | 2/2024 |
| TW | 202037208 | A | 10/2020 |
| WO | 2007/001134 | A1 | 1/2007 |
| WO | 2009/075282 | A1 | 6/2009 |
| WO | 2010/104435 | A1 | 9/2010 |
| WO | 2012/050614 | A1 | 4/2012 |
| WO | 2012/096611 | A2 | 7/2012 |
| WO | 2012/161612 | A1 | 11/2012 |
| WO | 2013/023171 | A1 | 2/2013 |
| WO | 2015/196044 | A1 | 12/2015 |
| WO | 2016/044069 | A1 | 3/2016 |
| WO | 2017/008851 | A1 | 1/2017 |
| WO | 2017/014842 | A1 | 1/2017 |
| WO | 2017/176746 | A1 | 10/2017 |
| WO | 2017/193056 | A1 | 11/2017 |
| WO | 2018/144940 | A1 | 8/2018 |
| WO | 2018/175615 | A1 | 9/2018 |
| WO | 2018/179870 | A1 | 10/2018 |
| WO | 2019/139745 | A1 | 7/2019 |
| WO | 2019/183072 | A1 | 9/2019 |
| WO | 2019/183107 | A1 | 9/2019 |
| WO | 2020/027990 | A1 | 2/2020 |
| WO | 2020/060705 | A1 | 3/2020 |
| WO | 2020/076350 | A1 | 4/2020 |
| WO | 2020/095597 | A1 | 5/2020 |
| WO | 2020/163052 | A1 | 8/2020 |
| WO | 2020/171947 | A1 | 8/2020 |
| WO | 2021/003112 | A1 | 1/2021 |
| WO | 2021/137898 | A1 | 7/2021 |
| WO | 2021/211354 | A1 | 10/2021 |
| WO | 2021/242996 | A1 | 12/2021 |
| WO | 2022/031477 | A1 | 2/2022 |
| WO | 2022/056024 | A1 | 3/2022 |
| WO | 2022/155529 | A1 | 7/2022 |
| WO | 2022/164930 | A1 | 8/2022 |
| WO | 2023/283352 | A1 | 1/2023 |
| WO | 2023/076405 | A1 | 5/2023 |
| WO | 2023/205182 | A1 | 10/2023 |
| WO | 2024/072997 | A1 | 4/2024 |
| WO | 2024/108180 | A1 | 5/2024 |

OTHER PUBLICATIONS

"Automatic Cell Planning (ACP)", Forsk, Retrieved on Jul. 18, 2024, Webpage available at: https://www.forsk.com/automatic-cell-planning-acp, 7 pages.

"NVIDIA Unveils 6G Research Cloud Platform to Advance Wireless Communications With AI", NVIDIA, Retrieved on Mar. 18, 2024, Available at https://nvidianews.nvidia.com/news/nvidia-unveils-6g-research-cloud-platform-to-advance-wireless-communications-with-ai, 2 pages.

Julien Berranger, "SIRADEL releases Bloonet its innovative solution for RAN design automation", SIRADEL, Retrieved on Oct. 21, 2021, Webpage available at: https://www.siradel.com/siradel-releases-bloonet-its-innovative-solution-for-ran-design-automation/, 6 pages.

"Mapbox Unveils Digital Twin in Partnership with Snowflake and Maxar to Revolutionize Telecom Visualization", Mapbox, Retrieved on Feb. 26, 2024, Webpage available at: https://www.mapbox.com/press-releases/mapbox-unveils-digital-twin-in-partnership-with-snowflake-and-maxar-to-revolutionize-telecom-visualization, 7 pages.

Monica Wamsley, "Blare Tech Builds 5G Network Planning Tools with CesiumJS", Cesium, Retrieved on Jan. 30, 2024, Webpage available at: https://cesium.com/blog/2024/01/30/blare-tech-builds-5g-network-planning-tools-with-cesiumjs/, 6 pages.

"Bridging the Gap Between Indoor and Outdoor Wireless", iBwave Reach, iBwave Solutions Inc., 1994-2020, 5 pages.

Terragraph Mesh, Retrieved on Jul. 18, 2024, Webpage Available at: <https://terragraph.com/assets/files/Terragraph_Mesh_Whitepaper-d906f1eb9c3ea7a8c1bbd8552b1f9f2d.pdf>, 11 pages.

"Canny edge detector", Scikit-image, Retrieved on Jul. 18, 2024, Webpage available at: <https://scikit-image.org/docs/stable/auto_examples/edges/plot_canny.html#sphx-glr-auto-examples-edges-plot-canny-py>, 2 pages.

"5G Fixed Wireless Access: Can FWA meet our cities needs?", Digital Twin SIM, Retrieved on Jul. 18, 2024, Webpage Available at: https://www.digitaltwinsim.com/fwa_modeling, 07 pages.

ETSI, "5G; Study on channel model for frequencies from 0.5 to 100 GHz (3GPP TR 38.901 version 17.1.0 Release 17)", ETSI TR 138 901, version 17.1.0, Release 17, Jan. 2024, 99 pages.

Office Communication for U.S. Appl. No. 18/530,034 mailed Jul. 15, 2024, pp. 1-7.

International Search Report and Written Opinion for International Patent Application No. PCT/US2021/043308 mailed Nov. 2, 2021, pp. 1-7.

Office Communication for U.S. Appl. No. 17/177,131 mailed Nov. 12, 2021, pp. 1-5.

Extended European Search Report for European Patent Application No. 19772471.9 mailed Nov. 8, 2021, 1-8 Pages.

Office Communication for U.S. Appl. No. 17/177,145 mailed Nov. 16, 2021, pp. 1-16.

Office Communication for U.S. Appl. No. 17/177,131 mailed Dec. 17, 2021, pp. 1-14.

Eric J Black, "Holographic Beam Forming and MIMO," Pivotal Commware, 2017, pp. 1-8.

Bjorn Ekman, "Machine Learning for Beam Based Mobility Optimization in NR," Master of Science Thesis in Communication Systems, Department of Electrical Engineering, Linkoping University, 2017, pp. 1-85.

Office Communication for U.S. Appl. No. 17/112,940 mailed Dec. 22, 2021, pp. 1-15.

International Search Report and Written Opinion for International Patent Application No. PCT/US2021/049502 mailed Dec. 14, 2021, pp. 1-7.

Office Communication for U.S. Appl. No. 17/469,694 mailed Jan. 20, 2022, pp. 1-9.

(56) References Cited

OTHER PUBLICATIONS

Office Communication for U.S. Appl. No. 17/537,233 mailed Feb. 4, 2022, pp. 1-9.
Office Communication for U.S. Appl. No. 17/112,940 mailed Mar. 17, 2022, pp. 1-14.
Office Communication for U.S. Appl. No. 17/576,832 mailed Mar. 18, 2022, pp. 1-15.
Office Communication for U.S. Appl. No. 17/177,145 mailed Mar. 24, 2022, pp. 1-18.
Office Communication for U.S. Appl. No. 17/306,361 mailed Mar. 28, 2022, pp. 1-7.
Extended European Search Report for European Patent Application No. 19844867.2 mailed Mar. 30, 2022, pp. 1-16.
Office Communication for U.S. Appl. No. 17/576,832 mailed Apr. 1, 2022, pp. 1-14.
Office Communication for U.S. Appl. No. 17/585,418 mailed Apr. 8, 2022, pp. 1-9.
Office Communication for U.S. Appl. No. 17/537,233 mailed Apr. 20, 2022, pp. 1-9.
Office Communication for U.S. Appl. No. 17/203,255 mailed Apr. 26, 2022, pp. 1-17.
Office Communication for U.S. Appl. No. 17/177,131 mailed Apr. 27, 2022, pp. 1-14.
International Search Report and Written Opinion for International Patent Application No. PCT/US2022/012613 mailed May 10, 2022, pp. 1-7.
International Search Report and Written Opinion for International Patent Application No. PCT/US2022/013942 mailed May 10, 2022, pp. 1-7.
"Common understanding of repeaters", Qualcomm Incorporated, 3GPP TSG RAN WG4 #98_e, R4-2102829, 2021, Accessed: May 25, 2022, pp. 1-2.
"General views on NR repeater", MediaTek Inc., 3GPP TSG RAN WG4 #98_e, R4-2101156, 2021, Accessed: May 25, 2022, pp. 1-4.
Office Communication for U.S. Appl. No. 17/177,145 mailed Jun. 3, 2022, pp. 1-5.
Office Communication for U.S. Appl. No. 17/576,832 mailed Jul. 13, 2022, pp. 1-15.
Office Communication for U.S. Appl. No. 17/585,418 mailed Jul. 22, 2022, pp. 1-6.
Office Communication for U.S. Appl. No. 17/585,418 mailed Aug. 4, 2022, pp. 1-2.
Office Communication for U.S. Appl. No. 17/576,832 mailed Apr. 28, 2023, pp. 1-15.
Office Communication for U.S. Appl. No. 17/859,632 mailed May 16, 2023, pp. 1-4.
Office Action for Chinese Patent Application No. 201980019925.1 mailed Sep. 27, 2021, 18 pages including English Translation.
Shimura et al., "A study of indoor area expansion by quasi-millimeter wave repeater," The Collection of Lecture Articles of the 2018 IEICE General Conference, Mar. 2018, pp. 1-5.
Office Action for Japanese Patent Application No. JP 2021-505304 mailed May 9, 2023, 08 Pages including English translation.
International Search Report and Written Opinion for International Patent Application No. PCT/US2018/066329 mailed May 31, 2019, pp. 1-8.
International Preliminary Report on Patentability Chapter 1 for International Patent Application No. PCT/US2018/066329 mailed Jul. 23, 2020, pp. 1-7.
International Preliminary Report on Patentability for International Patent Application No. PCT/US2019/022942 mailed Oct. 1, 2020, pp. 1-8.
International Preliminary Report on Patentability Chapter I for International Patent Application No. PCT/US2019/041053 mailed Feb. 11, 2021, pp. 1-6.
International Preliminary Report on Patentability Chapter I for International Patent Application No. PCT/US2019/022987 mailed Oct. 1, 2020, pp. 1-9.
International Preliminary Report on Patentability Chapter I for International Patent Application No. PCT/US2019/047093 mailed Apr. 1, 2021, pp. 1-5.
International Preliminary Report on Patentability Chapter I for International Patent Application No. PCT/US2020/013713 mailed Aug. 19, 2021, pp. 1-6.
International Preliminary Report on Patentability Chapter I for International Patent Application No. PCT/US2020/016641 mailed Sep. 2, 2021, pp. 1-5.
International Preliminary Report on Patentability Chapter I for International Patent Application No. PCT/US2020/048806 mailed Jul. 14, 2022, pp. 1-7.
International Preliminary Report on Patentability Chapter I for International Patent Application No. PCT/US2021/043308 mailed Feb. 16, 2023, pp. 1-6.
International Search Report and Written Opinion for International Patent Application No. PCT/US2021/026400 mailed Jul. 20, 2021, pp. 1-6.
International Preliminary Report on Patentability Chapter I for International Patent Application No. PCT/US2021/034479 mailed Dec. 8, 2022, pp. 1-5.
International Preliminary Report on Patentability Chapter I for International Patent Application No. PCT/US2022/012613 mailed Jul. 27, 2023, pp. 1-6.
International Preliminary Report on Patentability Chapter I for International Patent Application No. PCT/US2022/013942 mailed Aug. 10, 2023, pp. 1-6.
International Preliminary Report on Patentability Chapter I for International Patent Application No. PCT/US2021/049502 mailed Mar. 23, 2023, pp. 1-6.
Cheng et al., "Real-time two-dimensional beam steering with gate-tunable materials: a theoretical investigation", Applied Optics, vol. 55, No. 22, Aug. 1, 2016, pp. 6137-6144.
Office Communication for U.S. Appl. No. 17/334,105 mailed Oct. 25, 2023, pp. 4.
Office Communication for U.S. Appl. No. 18/136,238 mailed Oct. 25, 2023, pp. 1-9.
Office Communication for U.S. Appl. No. 17/334,105 mailed Nov. 8, 2023, pp. 1-13.
Office Communication for U.S. Appl. No. 17/334,105 mailed Nov. 16, 2023, pp. 2.
Office Action for Japanese Patent Application No. JP 2021-505304 mailed Oct. 26, 2023, 06 Pages including English translation.
Office Action for Japanese Patent Application No. JP 2021-549237 mailed Oct. 16, 2023, 06 Pages including English translation.
Office Communication for U.S. Appl. No. 18/205,433 mailed Dec. 12, 2023, 17 Pages.
Office Communication for U.S. Appl. No. 17/980,391 mailed Nov. 21, 2023, 10 Pages.
Office Communication for U.S. Appl. No. 17/859,632 mailed Dec. 18, 2023, 10 Pages.
Office Communication for Korean Patent Application No. 10-2020-7029161 mailed Dec. 11, 2023, 6 Pages including English translation.
Office Communication for Japanese Patent Application No. JP 2020-548724 mailed Oct. 2, 2023, 05 Pages including English translation.
Extended European Search report for European Patent Application No. EP 20908525.7 mailed Jan. 3, 2024, 11 pages.
Nawaz et al., "Double-Differential-Fed, Dual-Polarized Patch Antenna With 90 dB Interport RF Isolation for a 2.4 GHZ In-Band FullDuplex Transceiver", IEEE Antennas and Wireless Propagation Letters, vol. 17, No. 2, Feb. 2018, pp. 287-290.
International Search Report and Written Opinion for International Patent Application No. PCT/US2023/034033 mailed Dec. 12, 2023, 13 Pages.
International Preliminary Report on Patentability Chapter I for International Patent Application No. PCT/US2022/036381 mailed Jan. 18, 2024, 6 Pages.
Office Communication for Korean Patent Application No. 10-2021-7029953 mailed Jan. 2, 2024, 8 Pages including English translation.

(56) References Cited

OTHER PUBLICATIONS

Wolf et al., "Phased-Array Sources Based on Nonlinear Metamaterial Nanocavities", Nature Communications, vol. 6, 7667, 2015 Macmillan Publishers Limited, pp. 1-6.
U.S. Appl. No. 62/743,672, filed Oct. 10, 2018, pp. 1-278.
Examination Report no. 1 for Australian Patent Application No. 2019239864, mailed Jul. 7, 2022, pp. 1-3.
Office Communication for U.S. Appl. No. 16/730,690 mailed Apr. 21, 2021, pp. 1-2.
Office Communication for U.S. Appl. No. 17/397,442 mailed Sep. 8, 2023, pp. 1-16.
Intention to Grant for European Patent Application No. 20759272.6 mailed Sep. 19, 2023, 11 pages.
Notice of Acceptance for Australian Patent Application No. 2019239864 mailed Jan. 16, 2023, pp. 1-3.
Search Report for Chinese Patent Application No. 201980019925.1 mailed on Sep. 19, 2021, pp. 1-2.
Office Communication for U.S. Appl. No. 15/870,758 mailed Apr. 16, 2019, pp. 1-10.
Office Communication for U.S. Appl. No. 15/925,612 mailed Dec. 19, 2018, pp. 1-12.
Office Communication for U.S. Appl. No. 16/049,630 mailed Feb. 18, 2020, pp. 1-5.
Office Communication for U.S. Appl. No. 17/891,970 mailed Sep. 25, 2023, pp. 1-8.
Office Communication for U.S. Appl. No. 17/203,255 mailed May 5, 2022, pp. 1-2.
Office Communication for U.S. Appl. No. 16/846,670 mailed Apr. 21, 2021, pp. 1-2.
Office Communication for U.S. Appl. No. 16/268,469 mailed May 16, 2019, pp. 1-16.
Office Communication for U.S. Appl. No. 16/280,939 mailed May 13, 2019, pp. 1-22.
Office Communication for U.S. Appl. No. 16/440,815 mailed Jul. 17, 2019, pp. 1-16.
Office Communication for U.S. Appl. No. 16/358,112 mailed May 15, 2019, pp. 1-17.
International Search Report and Written Opinion for International Patent Application No. PCT/US2019/022942 mailed Jul. 4, 2019, pp. 1-10.
Yurduseven et al., "Dual-Polarization Printed Holographic Multibeam Metasurface Antenna" Aug. 7, IEEE Antennas and Wireless Propagation Letters. pp. 10.1109/LAWP.2017, pp. 1-4.
International Search Report and Written Opinion for International Patent Application No. PCT/US2019/022987 mailed Jul. 2, 2019, pp. 1-11.
Office Communication for U.S. Appl. No. 16/280,939 mailed Jul. 18, 2019, pp. 1-7.
Office Communication for U.S. Appl. No. 16/292,022 mailed Sep. 23, 2019, pp. 1-9.
Office Communication for U.S. Appl. No. 16/440,815 mailed Oct. 7, 2019, pp. 1-5.
Office Communication for U.S. Appl. No. 16/268,469 mailed Sep. 10, 2019, pp. 1-11.
International Search Report and Written Opinion for International Patent Application No. PCT/US2019/041053 mailed Aug. 27, 2019, pp. 1-7.
Office Communication for U.S. Appl. No. 16/568,096 mailed Oct. 24, 2019, pp. 1-10.
International Search Report and Written Opinion for International Patent Application No. PCT/US2019/047093 mailed Oct. 21, 2019, pp. 1-6.
Office Communication for U.S. Appl. No. 16/673,852 mailed Jun. 24, 2020, pp. 1-11.
Office Communication for U.S. Appl. No. 16/673,852 mailed Nov. 25, 2020, pp. 1-8.
Office Communication for U.S. Appl. No. 17/306,361 mailed Sep. 9, 2022, pp. 1-7.
Office Communication for U.S. Appl. No. 17/576,832 mailed Sep. 23, 2022, pp. 1-5.
Office Communication for U.S. Appl. No. 17/306,361 mailed Sep. 27, 2022, pp. 1-7.
Office Communication for U.S. Appl. No. 17/379,813 mailed Oct. 5, 2022, pp. 1-11.
Office Communication for U.S. Appl. No. 17/217,882 mailed Oct. 13, 2022, pp. 1-14.
Office Communication for U.S. Appl. No. 17/397,442 mailed Oct. 27, 2022, pp. 1-8.
Office Communication for U.S. Appl. No. 17/859,632 mailed Oct. 27, 2022, pp. 1-12.
International Search Report and Written Opinion for International Patent Application No. PCT/US2022/036381 mailed Oct. 25, 2022, pp. 1-8.
Extended European Search Report for European Patent Application No. 20759272.6 mailed Nov. 3, 2022, pp. 1-9.
Office Communication for U.S. Appl. No. 17/334,105 mailed Nov. 30, 2022, pp. 1-7.
Office Communication for U.S. Appl. No. 17/576,832 mailed Dec. 15, 2022, pp. 1-15.
Falconer et al., "Coverage Enhancement Methods for LMDS," IEEE Communications Magazine, Jul. 2003, vol. 41, Iss. 7, pp. 86-92.
Office Communication for U.S. Appl. No. 17/708,757 mailed Jan. 20, 2023, pp. 1-5.
Office Communication for U.S. Appl. No. 17/379,813 mailed Feb. 3, 2023, pp. 1-10.
Office Communication for U.S. Appl. No. 17/112,895 mailed Feb. 6, 2023, pp. 1-8.
Office Communication for U.S. Appl. No. 17/379,813 mailed Feb. 15, 2023, pp. 1-3.
Office Communication for U.S. Appl. No. 17/859,632 mailed Feb. 28, 2023, pp. 1-13.
International Search Report and Written Opinion for International Patent Application No. PCT/US2022/047909 mailed Feb. 21, 2023, pp. 1-7.
Office Communication for U.S. Appl. No. 17/217,882 mailed May 15, 2023, pp. 1-6.
Office Action for Japanese Patent Application No. JP 2020-548724 mailed Mar. 8, 2023, 12 Pages including English translation.
Office Communication for U.S. Appl. No. 17/891,970 mailed Jun. 16, 2023, pp. 1-11.
Office Communication for U.S. Appl. No. 17/397,442 mailed Jun. 23, 2023, pp. 1-15.
Office Communication for U.S. Appl. No. 17/980,391 mailed Jul. 3, 2023, pp. 1-9.
International Search Report and Written Opinion for International Patent Application No. PCT/US2023/018993 mailed Jun. 27, 2023, pp. 1-9.
Office Communication for U.S. Appl. No. 17/576,832 mailed Jul. 13, 2023, pp. 1-3.
Office Communication for U.S. Appl. No. 18/136,238 mailed Jul. 20, 2023, pp. 1-8.
Examination Report for European Patent Application No. 19772471.9 mailed Jul. 28, 2023, pp. 1-4.
Office Action for Japanese Patent Application No. JP 2020-548724 mailed Jun. 15, 2023, pp. 1-6 including English translation.
Office Action for Korean Patent Application No. KR 10-2020-7029161 mailed Jul. 19, 2023, pp. 1-16 including English translation.
Office Communication for U.S. Appl. No. 17/708,757 mailed Aug. 4, 2023, pp. 1-8.
Office Communication for U.S. Appl. No. 17/859,632 mailed Aug. 8, 2023, pp. 1-14.
Office Communication for U.S. Appl. No. 17/334,105 mailed Aug. 11, 2023, pp. 1-16.
Office Communication for U.S. Appl. No. 17/576,832 mailed Aug. 16, 2023, pp. 1-7.
Office Communication for U.S. Appl. No. 17/576,832 mailed Aug. 24, 2023, pp. 1-4.
Office Communication for U.S. Appl. No. 16/049,630 mailed Jun. 24, 2019, pp. 1-5.
Office Communication for U.S. Appl. No. 16/049,630 mailed Aug. 7, 2019, pp. 1-13.

(56) References Cited

OTHER PUBLICATIONS

Office Communication for U.S. Appl. No. 16/049,630 mailed Dec. 9, 2019, pp. 1-13.
Office Communication for U.S. Appl. No. 16/440,815 mailed Jan. 8, 2020, pp. 1-8.
Office Communication for U.S. Appl. No. 16/730,932 mailed Mar. 6, 2020, pp. 1-13.
Office Communication for U.S. Appl. No. 16/049,630 mailed Mar. 31, 2020, pp. 1-15.
Office Communication for U.S. Appl. No. 16/734,195 mailed Mar. 20, 2020, pp. 1-8.
Office Communication for U.S. Appl. No. 16/846,670 mailed Jun. 11, 2020, pp. 1-12.
International Search Report and Written Opinion for International Patent Application No. PCT/US2020/016641 mailed Apr. 14, 2020, pp. 1-6.
Gao et al., "Holographic Artificial Impedance Surface Antenna Based on Circular Patch", 2018 International Conference on Microwave and Millimeter Wave Technology (ICMMT), 2018, pp. 1-3.
Nishiyama et al., "Polarization Controllable Microstrip Antenna using Beam Lead PIN Diodes", 2006 Asia Pacific Microwave Conference, 2006, pp. 1-4.
International Search Report and Written Opinion for International Patent Application No. PCT/US2020/013713 mailed Apr. 21, 2020, pp. 1-7.
Office Communication for U.S. Appl. No. 16/049,630 mailed Aug. 19, 2020, pp. 1-18.
Office Communication for U.S. Appl. No. 16/730,932 mailed Aug. 25, 2020, pp. 1-5.
Office Communication for U.S. Appl. No. 16/983,927 mailed Aug. 31, 2020, pp. 1-7.
Office Communication for U.S. Appl. No. 16/983,978 mailed Sep. 16, 2020, pp. 1-7.
Office Communication for U.S. Appl. No. 16/049,630 mailed Oct. 15, 2020, pp. 1-14.
Office Communication for U.S. Appl. No. 16/983,978 mailed Oct. 27, 2020, pp. 1-13.
International Search Report and Written Opinion for International Patent Application No. PCT/US2020/048806 mailed Nov. 17, 2020, pp. 1-8.
Office Communication for U.S. Appl. No. 16/846,670 mailed Nov. 25, 2020, pp. 1-13.
Office Communication for U.S. Appl. No. 16/983,927 mailed Jan. 6, 2021, pp. 1-8.
Office Communication for U.S. Appl. No. 16/846,670 mailed Feb. 8, 2021, pp. 1-4.
Office Communication for U.S. Appl. No. 16/983,978 mailed Feb. 10, 2021, pp. 1-11.
Office Communication for U.S. Appl. No. 16/846,670 mailed Apr. 2, 2021, pp. 1-9.
Office Communication for U.S. Appl. No. 16/730,690 mailed Apr. 8, 2021, pp. 1-11.
Office Communication for U.S. Appl. No. 17/177,131 mailed Apr. 9, 2021, pp. 1-17.
Vu et al., "Joint Load Balancing and Interference Mitigation in 5G Heterogeneous Networks," IEEE on Wireless Communications, 2017, vol. 16, No. 9, pp. 6032-6046.
Office Communication for U.S. Appl. No. 17/177,145 mailed Apr. 19, 2021, pp. 1-11.
Office Communication for U.S. Appl. No. 17/112,940 mailed Jul. 21, 2021, pp. 1-22.
International Preliminary Report on Patentability Chapter I for International Patent Application No. PCT/US2021/026400 mailed Oct. 27, 2022, pp. 1-5.
Office Communication for U.S. Appl. No. 17/177,145 mailed Aug. 3, 2021, pp. 1-16.
Office Communication for U.S. Appl. No. 17/177,131 mailed Aug. 6, 2021, pp. 1-16.
Office Communication for U.S. Appl. No. 17/112,940 mailed Aug. 9, 2021, pp. 1-20.
International Search Report and Written Opinion for International Patent Application No. PCT/US2021/034479 mailed Aug. 10, 2021, pp. 1-6.
Office Communication for U.S. Appl. No. 17/332,136 mailed Sep. 2, 2021, pp. 1-9.
Office Communication for U.S. Appl. No. 17/177,145 mailed Oct. 14, 2021, pp. 1-5.
International Preliminary Report on Patentability Chapter I for International Patent Application No. PCT/US2022/047909 mailed May 10, 2024, 5 Pages.
Office Communication for European Patent Application No. EP 19772471.9 mailed May 31, 2024, 9 pages.
Extended European Search report for European Patent Application No. EP 21814490.5 mailed May 28, 2024, 12 pages.
"3rd Generation Partnership Project; Technical Specification Group Services and System Aspects; 3GPP System Architecture Evolution (SAE); Security architecture (Release 15)", 3GPP TS 33.401, V15.11.0, Mar. 27, 2020 pp. 1-163.
Gemalto et al., "Background information for relay node security solution", 3GPP CT WG6 Meeting#59, C6-110135, Feb. 22-25, 2011, 13 pages.
Office Communication for U.S. Appl. No. 15/925,612 mailed Jun. 15, 2018, pp. 1-9.
U.S. Appl. No. 14/510,947, filed Oct. 9, 2014, pp. 1-76.
Office Communication for U.S. Appl. No. 16/049,630 mailed Oct. 4, 2018, pp. 1-13.
Office Communication for U.S. Appl. No. 15/870,758 mailed Oct. 1, 2018, pp. 1-12.
Office Communication for U.S. Appl. No. 16/136,119 mailed Nov. 23, 2018, pp. 1-12.
Office Communication for U.S. Appl. No. 16/136,119 mailed Mar. 15, 2019, pp. 1-8.
Office Communication for U.S. Appl. No. 16/292,022 mailed Jun. 7, 2019, pp. 1-13.
Office Communication for U.S. Appl. No. 16/049,630 mailed Apr. 12, 2019, pp. 1-13.
Office Communication for U.S. Appl. No. 17/980,391 mailed Apr. 12, 2024, 5 Pages.
Extended European Search report for European Patent Application No. EP 21788290.1 mailed Mar. 28, 2024, 9 pages.
Office Communication for European Patent Application No. 19844867.2 mailed Apr. 16, 2024, 8 Pages.
Office Communication for U.S. Appl. No. 17/891,970 mailed Feb. 12, 2024, pp. 1-8.
Decision to Grant for Japanese Patent Application No. JP 2021-505304 mailed Feb. 5, 2024, 06 Pages including English translation.
International Search Report and Written Opinion for International Patent Application No. PCT/US2023/080392 mailed Feb. 27, 2024, 15 Pages.
Office Communication for U.S. Appl. No. 17/974,278 mailed Mar. 28, 2024, pp. 1-8.

* cited by examiner

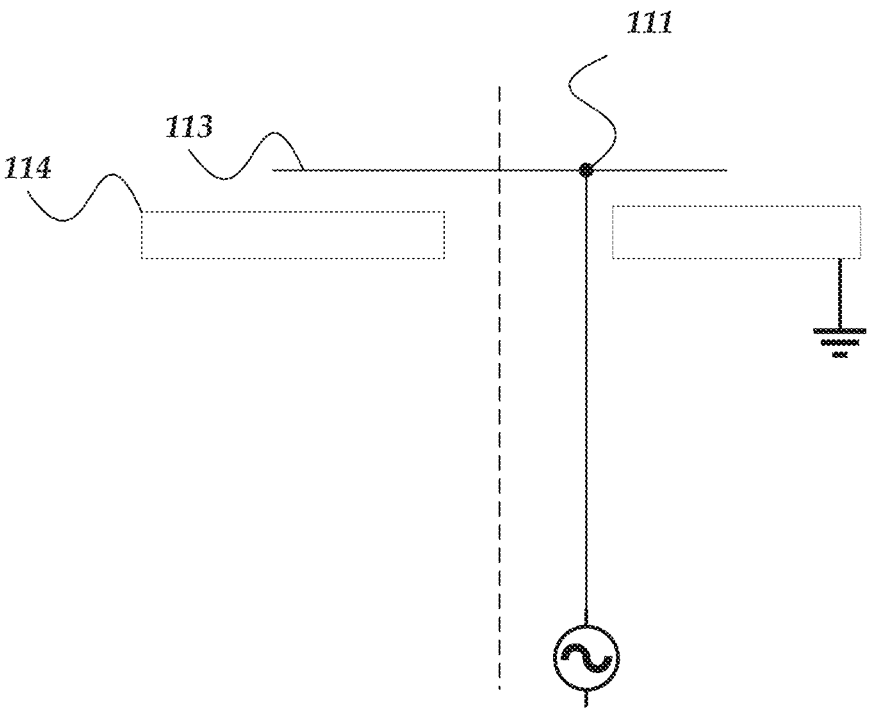
FIG. 1A - PRIOR ART
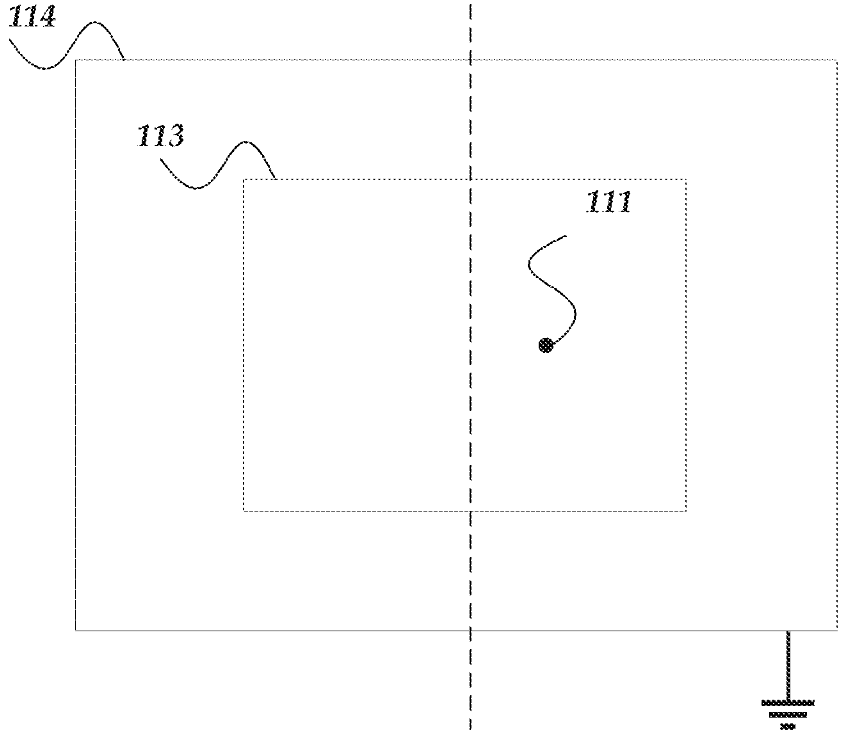
FIG. 1B – PRIOR ART

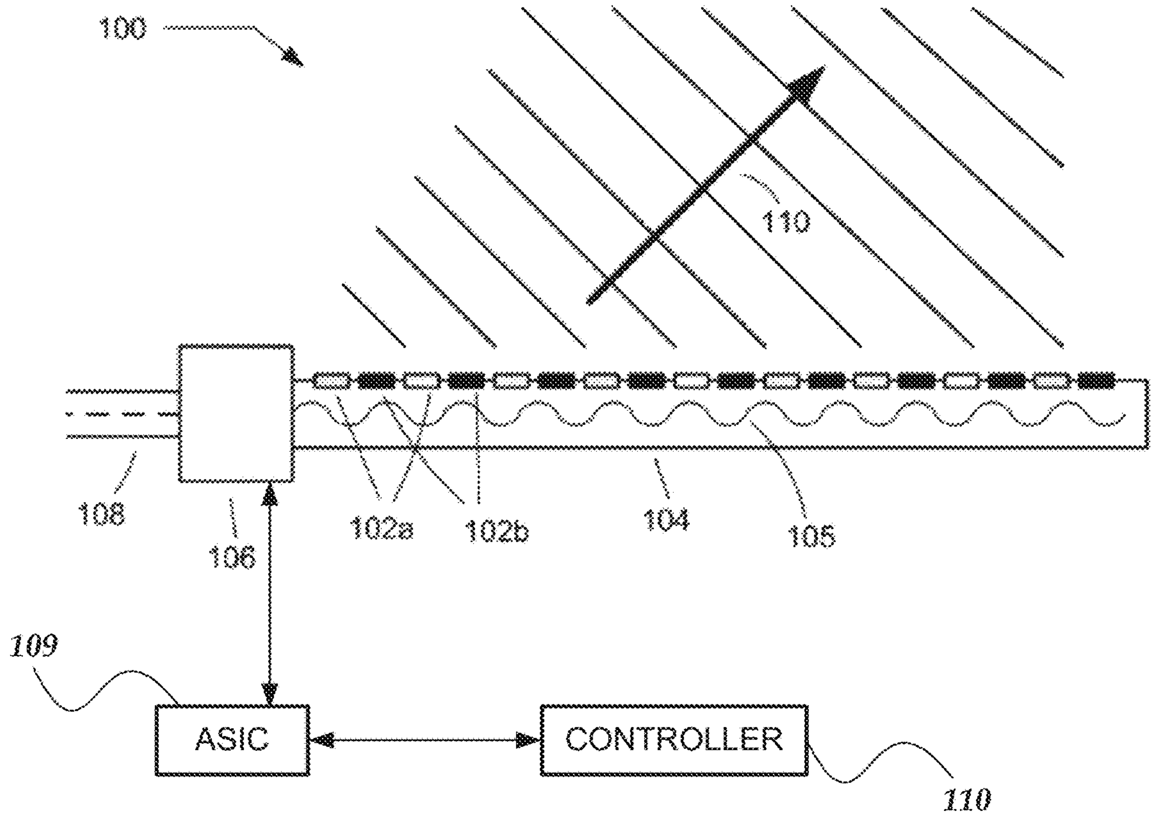
FIG. 1C – PRIOR ART
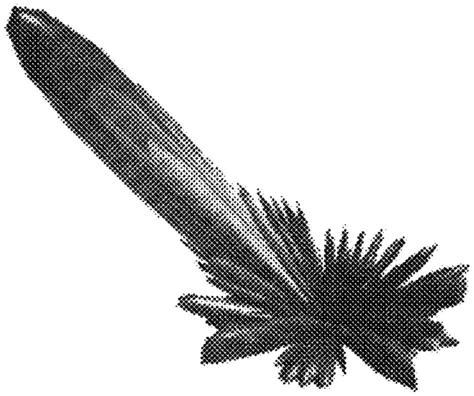
FIG. 1D – PRIOR ART

SWITCHABLE PATCH ANTENNA

CROSS-REFERENCE TO RELATED APPLICATIONS

This Utility Patent Application is a Continuation of U.S. patent application Ser. No. 17/217,882 filed on Mar. 30, 2021, now U.S. Pat. No. 11,757,180 issued on Sep. 12, 2023, which is a Continuation of U.S. patent application Ser. No. 16/673,852 filed on Nov. 4, 2019, now U.S. Pat. No. 10,971,813 issued on Apr. 6, 2021, which is a Continuation of U.S. patent application Ser. No. 16/280,939 filed on Feb. 20, 2019, now U.S. Pat. No. 10,468,767 issued on Nov. 5, 2019, the benefit of which is claimed under 35 U.S.C. § 120, and the contents of which are each further incorporated in entirety by reference.

TECHNICAL FIELD

This antenna relates to a patch antenna, and in particular a patch antenna that is switchable to turn off radiation of sinusoidal signals suitable, but not exclusively, for telecommunication.

BACKGROUND

Patch (or microstrip) antennas typically include a flat metal sheet mounted over a larger metal ground plane. The flat metal sheet usually has a rectangular shape, and the metal layers are generally separated using a dielectric spacer. The flat metal sheet has a length and a width that can be optimized to provide a desired input impedance and frequency response. Patch antennas can be configured to provide linear or circular polarization. Patch antennas are popular because of their simple design, low profile, light weight, and low cost. An exemplary patch antenna is shown in FIGS. 1A and 1B.

Additionally, multiple patch antennas on the same printed circuit board may be employed by high gain array antennas, phased array antennas, or holographic metasurface antennas (HMA), in which a beam of radiated waveforms for a radio frequency (RF) signal or microwave frequency signal may be electronically shaped and/or steered by large arrays of antennas. An exemplary HMA antenna and a beam of radiated waveforms is shown in FIGS. 1C and 1D. Historically, the individual antennas are located closely together to shape and steer a beam of radiated waveforms for a provided sinusoidal signal. Unfortunately, signals may be mutually coupled between the antennas because of their close proximity to each other. Improved designs are constantly sought to improve performance and further reduce cost. In view of at least these considerations, the novel inventions disclosed herein were created.

BRIEF DESCRIPTION OF THE DRAWINGS

FIG. 1A illustrates an embodiment of a schematic side view of a patch antenna that is known in the prior art;

FIG. 1B shows an embodiment of a schematic top view of a patch antenna that is known in the prior art;

FIG. 1C shows an embodiment of an exemplary surface scattering antenna with multiple varactor elements arranged to propagate electromagnetic waveforms to form an exemplary instance of Holographic Metasurface Antennas (HMA);

FIG. 1D shows an embodiment of an exemplary beam of electromagnetic wave forms generated by the Holographic Metasurface Antennas (HMA) shown in FIG. 1C;

DESCRIPTION OF THE EMBODIMENTS

Figure 2A:
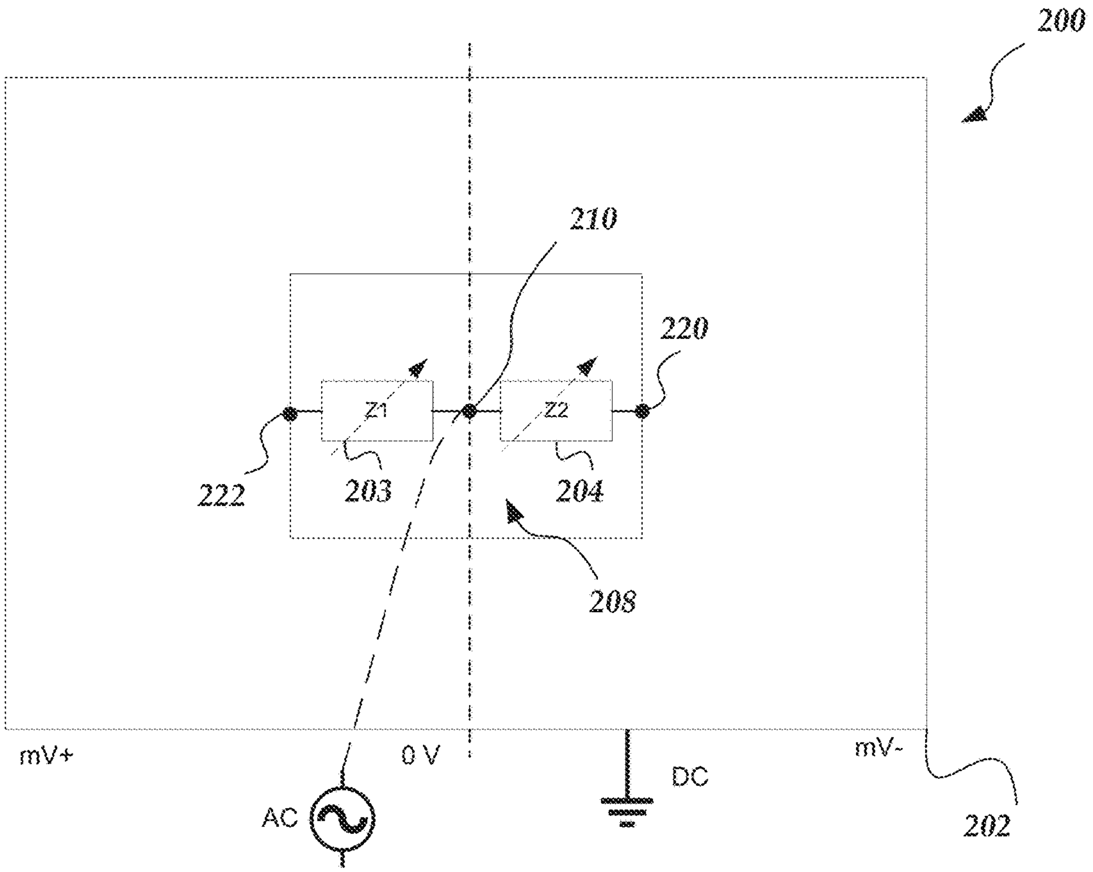
FIG. 2A illustrates a schematic top view of an exemplary switchable patch antenna that is arranged in a monopole mode of radiation, wherein two components having separate variable impedances (Z1 and Z2) are coupled to each other and a signal source at a terminal centered in a middle of an aperture.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards an antenna configured as a switchable patch antenna. An exemplary switchable patch antenna comprises a planar conductor having an aperture (hole) formed in the middle of the planar conductor. Radiation of a sinusoidal signal is controlled by comparison of separate impedance values for two components that have separate impedance values. Each of the two components have one end coupled together at the terminal positioned at a center of the aperture and their other ends separately coupled to opposing edges of the aperture. A sinusoidal signal source, e.g., an alternating current (AC) signal source, is also coupled to the terminal positioned at the aperture's center. Further, when the impedance values of both components are substantially equivalent, radiation by the antenna of the provided signal and/or mutual coupling of other signals is disabled. Also, when an impedance value of one of the two components is substantially greater than the other impedance value of the other component, the provided signal is radiated and/or mutual coupling is enabled.

In one or more embodiments, a positive waveform of the signal is radiated towards the component having an impedance value substantially less than another impedance value of the other component. In this way, a phase of the radiated signal may be shifted 180 degrees based on which of the two components provides an impedance value substantially less than the other impedance value provided by the other component.

In one or more embodiments, a first component provides a fixed impedance value and the second component provides a variable impedance value. Further, the variable impedance value of the second component may be provided by one or more of an electronic switch, mechanical switch, varactor, relay, or the like. In one or more embodiments, when a switch is conducting (closed) its variable impedance value is relatively low, e.g., one ohm, and when the switch is non-conducting (open) the variable impedance value may be infinity. Thus, when the non-conducting switch's variable impedance value is substantially greater (infinity) than the fixed impedance value of the first component, a signal is radiated by the antenna. Conversely, the signal is non-radiated when the second component's switch is conducting and it's variable impedance value is substantially equivalent to the fixed impedance value.

In one or more embodiments, a fixed impedance value may be provided for the first or second component during manufacture of the switchable patch antenna, e.g., a metal wire, metallic trace, extended segment of the planar surface, resistor, capacitor, inductor, or the like that provides a known (fixed) impedance value between the centrally located terminal and another terminal at an edge of the aperture. Further, in one or more embodiments, during manufacture of the switchable patch antenna, a low level (conducting) of a variable impedance value provided by one of the two components is selected to be substantially equivalent to a fixed impedance value or a low level (conducting) of another variable impedance value provided by the other of the two components. Additionally, a high level (non-conducting) of a variable impedance value provided by one of the two components is selected to be substantially greater than a fixed impedance value or the low level (conducting) of another variable impedance value provided by the other of the two components.

In one or more embodiments, a direct current (DC) ground is coupled to one or more portions of the planar conductor to help with impedance match, radiation patterns and be part of a bias for one or more of the two components that provide a variable impedance value. Also, in one or more embodiments, a shape of the aperture formed in the planar conductor can include rectangular, square, triangular, circular, curved, elliptical, quadrilateral, polygon, or the like.

In one or more embodiments, a length of the aperture is one half of a wavelength (lambda) of the signal. Also, in one or more embodiments, the signal comprises a radio frequency signal, a microwave frequency signal, or the like. Further, the signal may be provided by an electronic circuit, a signal generator, a waveguide, or the like coupled to the end of the segment of the planar conductor within the aperture.

Additionally, in one or more embodiments, a holographic metasurface antennas (HMA) is employed that uses a plurality of the switchable path antennas as scattering elements to radiate a shaped and steered beam based on the provided AC signal. And any signal radiated by any of the plurality of switchable patch antennas, or any other resonant structures, is not mutually coupled to those switchable patch antennas that have their switch operating in a conduction state (closed).

Also, in one or more embodiments, to further reduce mutual coupling between closely located antennas, e.g., an array of antennas in an HMA, a distance between the planar conductors of these antennas may be arranged to be no more than a length of the radiated waveform of the provided signal divided by three and no less than a length of the waveform divided by eleven.

An exemplary prior art embodiment of a schematic side view of a non-switchable patch antenna is shown in FIG. 1A. Further, an exemplary embodiment of schematic top view is shown in FIG. 1B. As shown, the patch antenna is well known in the prior art and consists of a top planar (flat) sheet 113 or "patch" of conductive material such as metal, mounted over a larger planar sheet of metal 114 that operates as a ground plane. These two planar conductors are arranged to form a resonant part of a microstrip transmission line, and the top planar conductor is arranged to have a length of approximately one-half of a length of a signal waveform that the patch antenna is intended to radiate. A signal input to the top planar sheet 113 is offset from a center of the top planar sheet. Radiation of the signal waveforms is caused in part by discontinuities at the truncated edge of the top planar conductor (patch). Also, since the radiation occurs at the truncated edges of the top patch, the patch antenna acts slightly larger than its physical dimensions. Thus, for a patch antenna to be resonant (capacitive load equal to the inductive load), a length of the top planar conductor (patch) is typically arranged to be slightly shorter than one-half of the wavelength of the radiated waveforms.

In some embodiments, when patch antennas are used at microwave frequencies, the wavelengths of the signal are short enough that the physical size of the patch antenna can be small enough to be included in portable wireless devices, such as mobile phones. Also, patch antennas may be manufactured directly on the substrate of a printed circuit board.

In one or more embodiments, an HMA may use an arrangement of controllable elements (antennas) to produce an object wave. Also, in one or more embodiments, the controllable elements may employ individual electronic circuits, such as varactors, that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HMA can be used to that is capable of producing the beams described herein.

FIG. 1C illustrates one embodiment of a prior art HMA which takes the form of a surface scattering antenna 100 (i.e., an HMA) that includes multiple scattering elements 102*a*, 102*b* that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102*a*, 102*b* may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102*a*, 102*b* are adjustable scattering antennas having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1C, scattering elements that have been adjusted to a first state having first electromagnetic properties are depicted as the first elements 102*a*, while scattering elements that have been adjusted to a second state having second electromagnetic properties are depicted as the second elements 102*b*. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1C, the scattering elements 102*a*, 102*b* have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102*a*, 102*b* are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1C illustrates a one-dimensional array of scattering elements 102*a*, 102*b*. It will be understood that two- or three-dimensional arrays can also be used. In addition, these arrays can have different shapes. Moreover, the array illustrated in FIG. 1C is a regular array of scattering elements 102*a*, 102*b* with equidistant spacing between adjacent scattering elements, but it will be understood that other arrays may be irregular or may have different or variable spacing between adjacent scattering elements. Also, Application Specific Integrated Circuit (ASIC)109 is employed to control the operation of the row of scattering elements 102*a* and 102*b*. Further, controller 112 may be employed to control the operation of one or more ASICs that control one or more rows in the array.

The array of scattering elements 102*a*, 102*b* can be used to produce a far-field beam pattern that at least approximates a desired beam pattern by applying a modulation pattern (e.g., a hologram function, H) to the scattering elements receiving the reference wave ($\psi_{ref}$) from a reference wave source. Although the modulation pattern or hologram function is illustrated as sinusoidal, it will be recognized non-sinusoidal functions (including non-repeating or irregular functions) may also be used.

In at least some embodiments, the hologram function H (i.e., the modulation function) is equal to the complex conjugate of the reference wave and the object wave, i.e., $\psi_{ref}{}^{*}\psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

Also, although not shown, the invention is not limited to a varactor as a control element that enables a scattering element to emit a signal. Rather, many different types of control elements may be employed in this way. For example, one or more other embodiments may instead employ Field Effect Transistors (FETs), Microelectromechanical Systems (MEMS), Bipolar Junction Transistors (BSTs), or the like to enable scattering elements to turn on and turn off emitting the signal. Additionally, FIG. 1D shows an embodiment of an exemplary beam of electromagnetic wave forms generated by the HMA shown in FIG. 1C.

A generalized embodiment of the invention is shown in FIG. 2A. Terminal 210 operates as an input for a sinusoidal signal provided to patch antenna 200. Also, the patch antenna operates as an impedance comparator between an impedance value Z1 for component 203 and an impedance value Z2 for component 204. These components are coupled between terminals (222 and 220) at opposing edges of aperture 208 and center terminal 210. In one or more embodiments, at least one of the impedance values is variable to a high level and a low level while the other impedance value is fixed at a low level. In one or more embodiments, one of impedance values Z1 or Z2 is a fixed impedance value and the other is a variable impedance value that can be switched from a low level substantially equivalent to the fixed impedance value and a high level that is substantially greater than the fixed impedance value. Also, in one or more embodiments, both the impedance values Z1 and Z2 are variable impedance values.

Figure 2B:
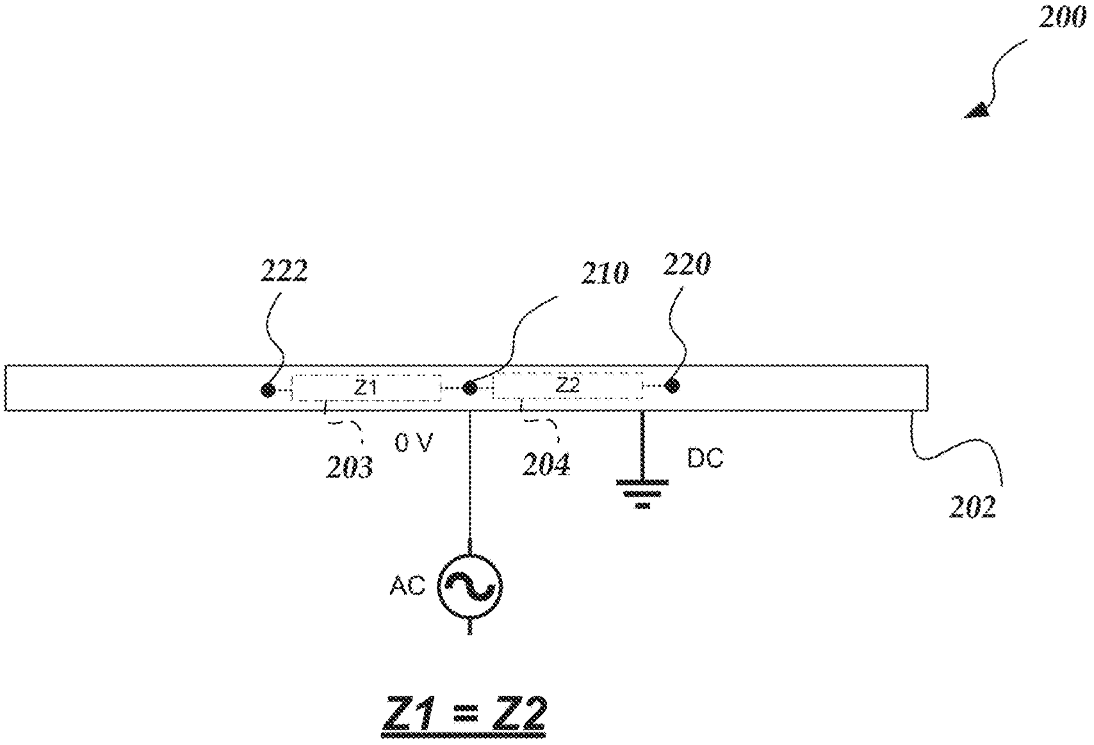
FIG. 2B shows a schematic side view of an exemplary switchable patch antenna, wherein the separate variable impedance values (Z1 and Z2) of a first component and a second component are substantially equivalent to each other and the antenna is not radiating a signal provided by a signal source.

As shown in FIG. 2B, when the impedance value Z1 is approximately equal to the impedance value Z2, the patch antenna does not radiate the sinusoidal signal and/or mutually couple with other signals. Although not shown here, the same effect occurs when a switch representing first component 203 is conducting (a short) which has substantially the same impedance value as the short by another switch representing the second component 204 on the other side of the patch antenna.

Figure 2C:
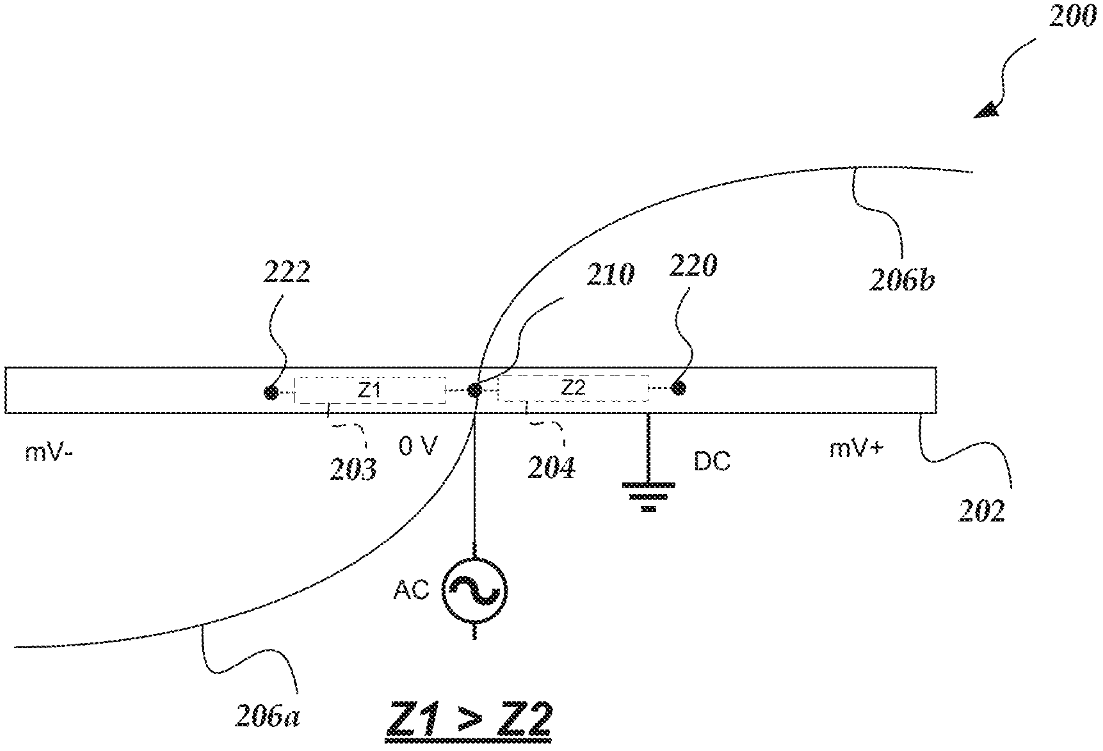
FIG. 2C illustrates a schematic side view of an exemplary switchable patch antenna, wherein a variable impedance value Z1 of the first component is substantially greater than a variable impedance value Z2 of the second component so that a signal is radiated by the antenna.
Figure 2D:
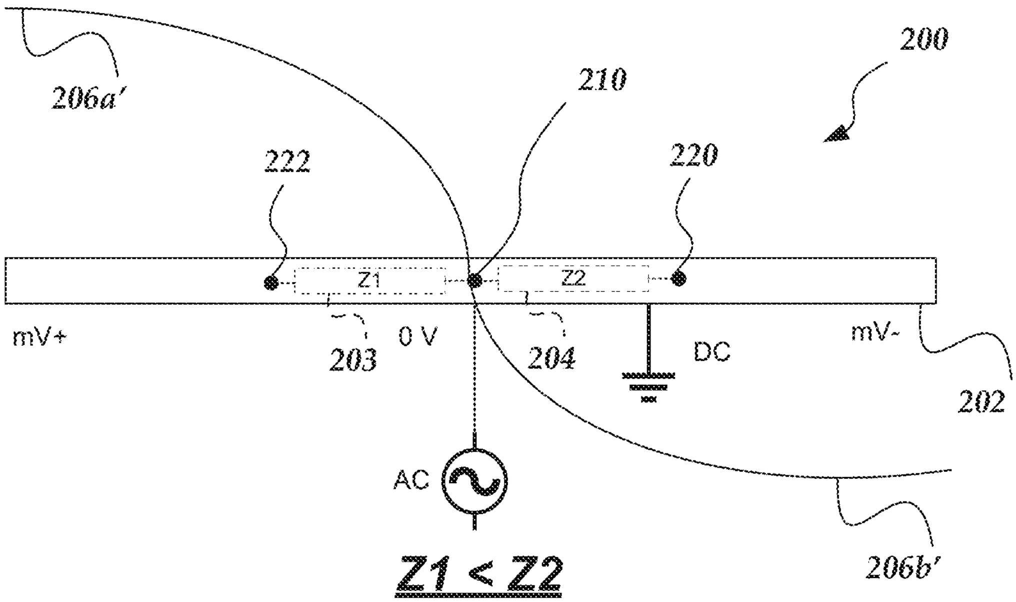
FIG. 2D shows a schematic side view of an exemplary switchable patch antenna, wherein a variable impedance value Z2 of the first component is substantially greater than a variable impedance value Z1 of the second component so that a signal having a 180 degree opposite phase to be radiated by the antenna.

As shown in FIG. 2D, when the impedance value Z1 is less than the impedance value Z2, then the sinusoidal signal travels towards the impedance value Z1, and there is radiation of the sinusoidal signal with a particular phase angle. Alternatively, as shown in FIG. 2C, when the impedance value Z1 is greater than the impedance value Z2, then the sinusoidal signal travels towards the impedance value Z2, and there is radiation of the sinusoidal signal at a phase angle that is 180 degrees offset from the radiation of the sinusoidal signal shown in FIG. 2D. This 180 degree phase angle offset may be used to optimize the radiation pattern of a phased array antenna or HMA antenna.

Figure 2E:
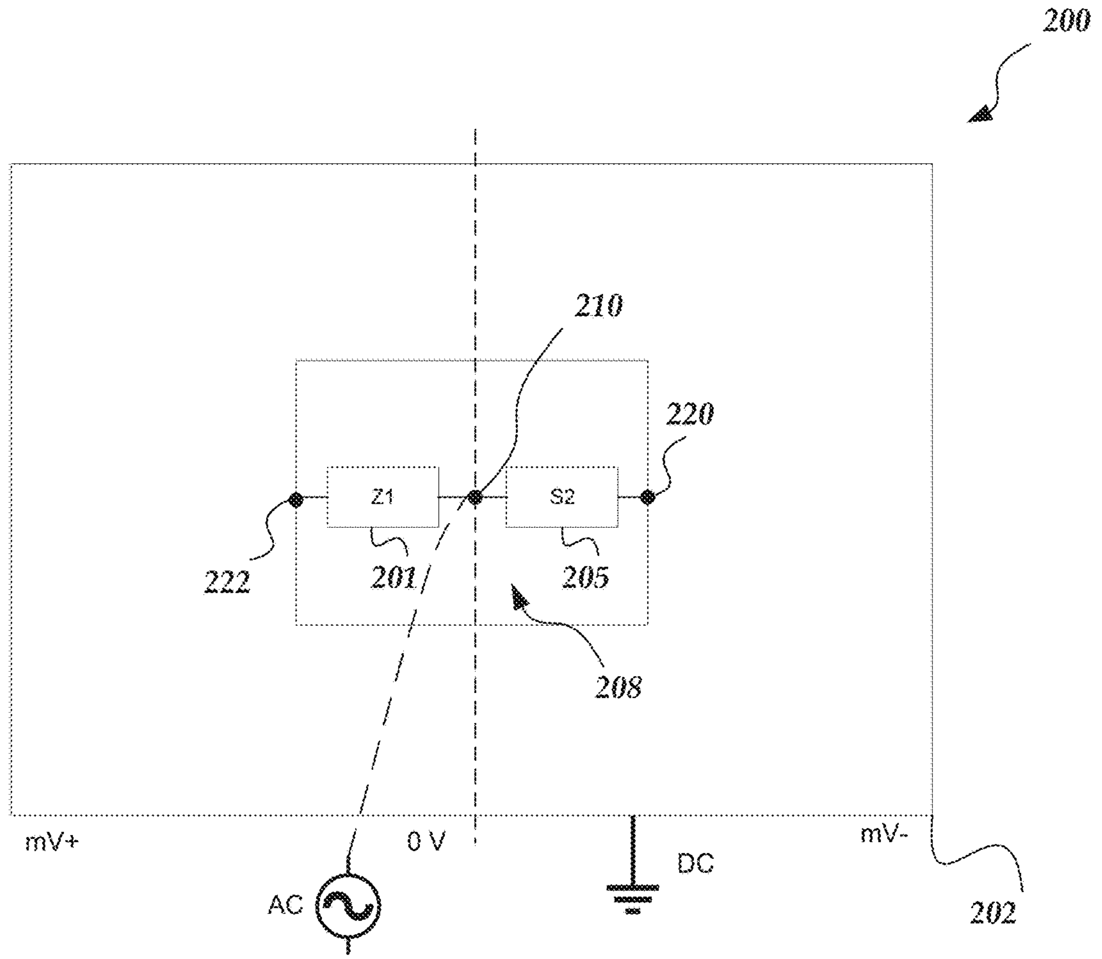
FIG. 2E illustrates a top view of an exemplary switchable patch antenna that is arranged in a monopole mode of operation, wherein a first component provides a fixed impedance value Z1 and a second component includes a switch S2 that provides a variable impedance value that is either substantially equivalent to fixed impedance value Z1 when the switch is conducting (closed) or the variable impedance value is substantially greater (infinity) than fixed impedance value Z1 when the switch is non-conducting (open)

FIG. 2E illustrates a top view of an exemplary switchable patch antenna that is arranged in a monopole mode of operation. A first component 201 is coupled to edge terminal 222 and center terminal 210 and provides a fixed impedance value Z1. Second component 205 is coupled between opposing edge terminal 220 and center terminal 210 and includes a switch S2. Further, switch S2 provides a variable impedance value that is either substantially equivalent to fixed impedance value Z1 when the switch is conducting (closed) or the variable impedance value is substantially greater (infinity) than fixed impedance value Z1 when the switch is non-conducting (open). An alternating current (AC) signal source provides a sinusoidal signal at center terminal 210. Aperture 208 is formed in a substantially rectangular shape in a middle of planar surface 202, which is manufactured from a conductive material, e.g., metal. Also, a Direct Current (DC) source ground is coupled to planar surface 202.

In one or more embodiments, switch S2 may include one or more of an electronic switch, a varactor, a relay, a fuse, a mechanical switch, and the like. Further, because the radiating standing wave on the patch antenna has a virtual ground along the center axis of planar surface 202, the sinusoidal signal presented at center terminal 210 tries to connect to the patch antenna's offset from the center terminal 210 to edge terminal 222 when the variable impedance of switch S2 is substantially greater than fixed impedance value Z1, as discussed in regard to FIGS. 2A-2D.

Figure 2F:
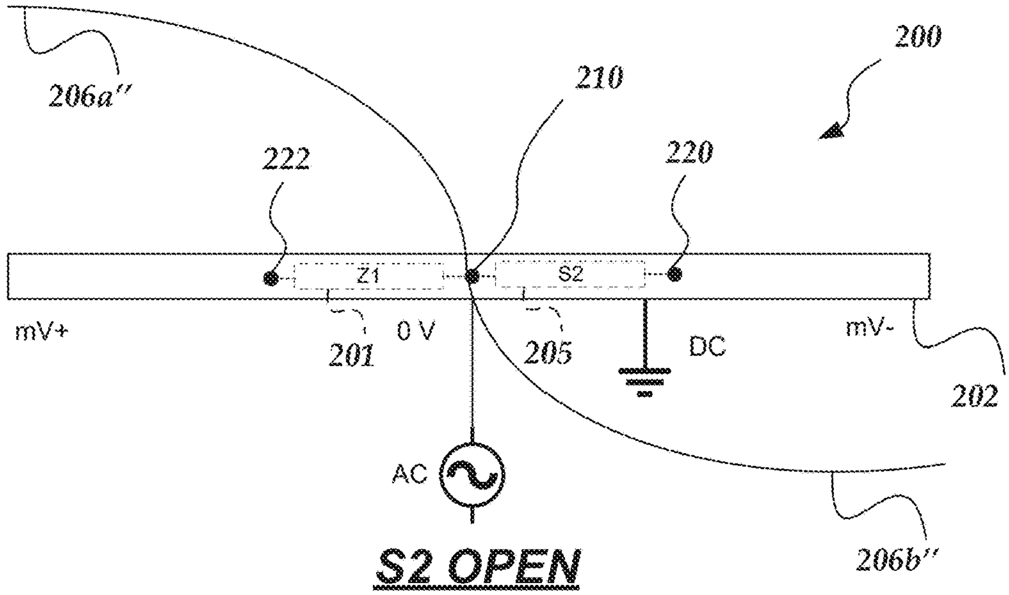
FIG. 2F shows a schematic side view of an exemplary switchable patch antenna, wherein a variable impedance value of the of the second component is substantially greater than a fixed impedance value Z1 of the first component when switch S2 is non-conducting (open) and a signal is radiated by the antenna.

FIG. 2F shows a schematic side view of an exemplary switchable patch antenna. In this embodiment, a variable impedance value of switch S2 is substantially greater than a fixed impedance value Z1 of first component 201 because switch S2 is non-conducting (open). This large disparity in the impedance values of components 201 and 205 causes radiation of the sinusoidal signal by switchable patch antenna 200.

Figure 2G:
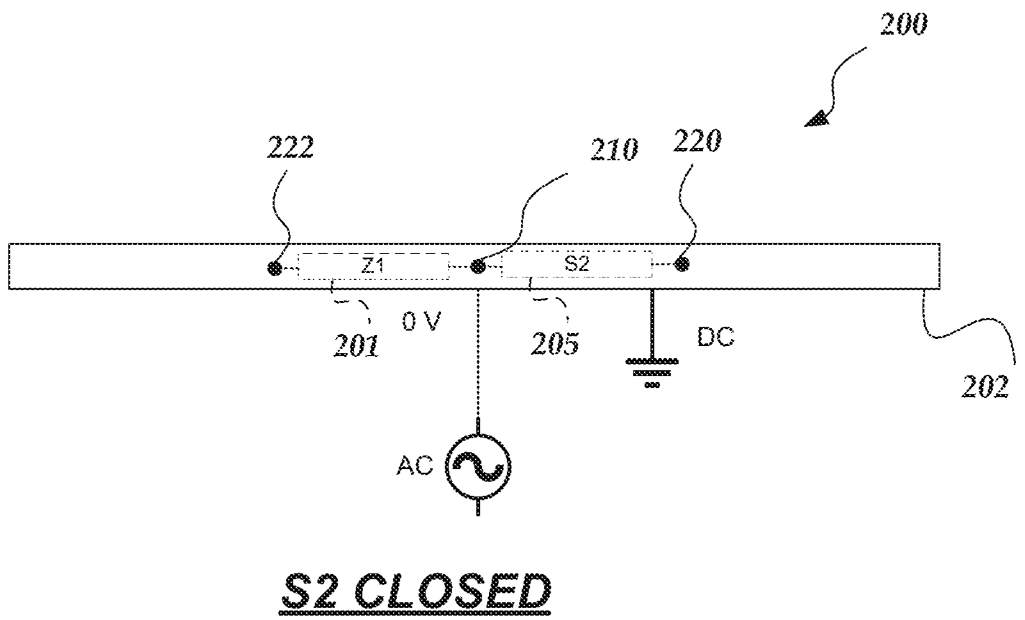
FIG. 2G illustrates a schematic side view of an exemplary switchable patch antenna, wherein switch S2 is conducting (closed) so that the variable impedance value of the second component is substantially equal to a fixed impedance value Z1 of the first component and no signal is radiated by the antenna.

FIG. 2G illustrates a schematic side view of an exemplary switchable patch antenna. In this embodiment, a variable impedance value of switch S2 for second component 205 is substantially equal to a fixed impedance value Z1 of first component 201 and no signal is radiated or mutually coupled by the antenna.

Figure 2H:
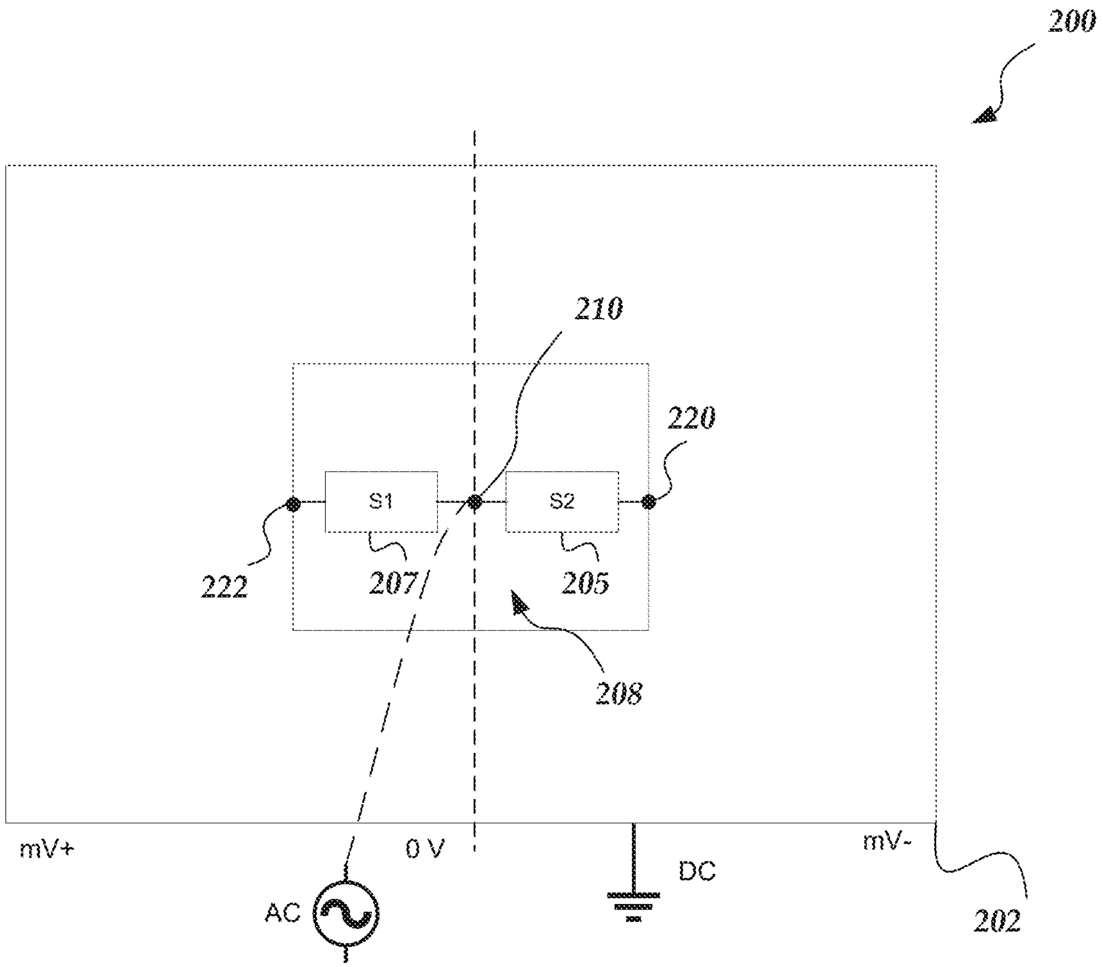
FIG. 2H shows a top view of an exemplary switchable patch antenna that is arranged in a monopole mode of operation, wherein a first component has a switch S1 with a variable impedance value and a second component includes switch S2 that also provides a variable impedance value, wherein the variable impedance values of switch S1 and switch S2 are substantially equivalent when they are both conducting, and wherein the variable impedance value of either switch that is non-conducting is substantially greater than the variable impedance value of the other switch that is conducting.

FIG. 2H shows a top view of an exemplary switchable patch antenna that is arranged in a monopole mode of operation, wherein a first component has a switch S1 with a variable impedance value and a second component includes switch S2 that also provides a variable impedance value, wherein the variable impedance values of switch S1 and switch S2 are substantially equivalent when they are both conducting, and wherein the variable impedance value of either switch that is non-conducting is substantially greater than the variable impedance value of the other switch that is conducting. In this way, a phase angle of the sinusoidal signal radiated by switchable patch antenna may be changed 180 degrees depending upon which of switch S1 or switch S2 are conducting or non-conducting. As shown in FIGS. 2C and 2D, and the corresponding text.

In one or more embodiments, switchable patch antenna 200 operates by being resonant at a desired center frequency with a half wavelength sine wave voltage distribution across the patch as shown in FIG. 2C (206*a* and 206*b*), FIG. 2D (206*a*' and 206*b*'), and FIG. 2F (206*a*") and 206*b*"). Further, because the sinusoidal signal's voltage passes thru zero Volts at a center terminal of the aperture in the planar surface of the switchable patch antenna, there is no sinusoidal current flow at the center terminal of the switchable patch antenna. Thus, the switchable patch antenna may operate with both contiguous and non-contiguous metallization across the center of the planar surface. Further, since the sinusoidal signal's voltage is zero Volts at the center terminal, the switchable patch antenna can also be mechanically shorted to ground as mentioned above without affecting the operation of the antenna.

So, in one or more embodiments, when the planar conductor is one contiguous region, the switchable patch antenna operates in a monopole mode. However, in one or more other embodiments, when the planar conductor includes two separate regions separated by a narrow gap, the switchable patch antenna radiates a provided sinusoidal signal in a dipole mode of operation. To provide the dipole mode of operation, the planar conductor of the switchable patch antenna is arranged differently into two separate regions that are electrically (and physically) connected to each other through the first component and second components. Also, a width of the non-conductive gap is minimized to optimize a dipole mode of radiation for the sinusoidal signal. The two components bridge the gap and electrically (and physically) connect the two regions of the planar surface to each other. An exemplary embodiment of the switchable patch antenna operating in a dipole mode is shown in FIGS. 3A and 3D.

Figure 3A:
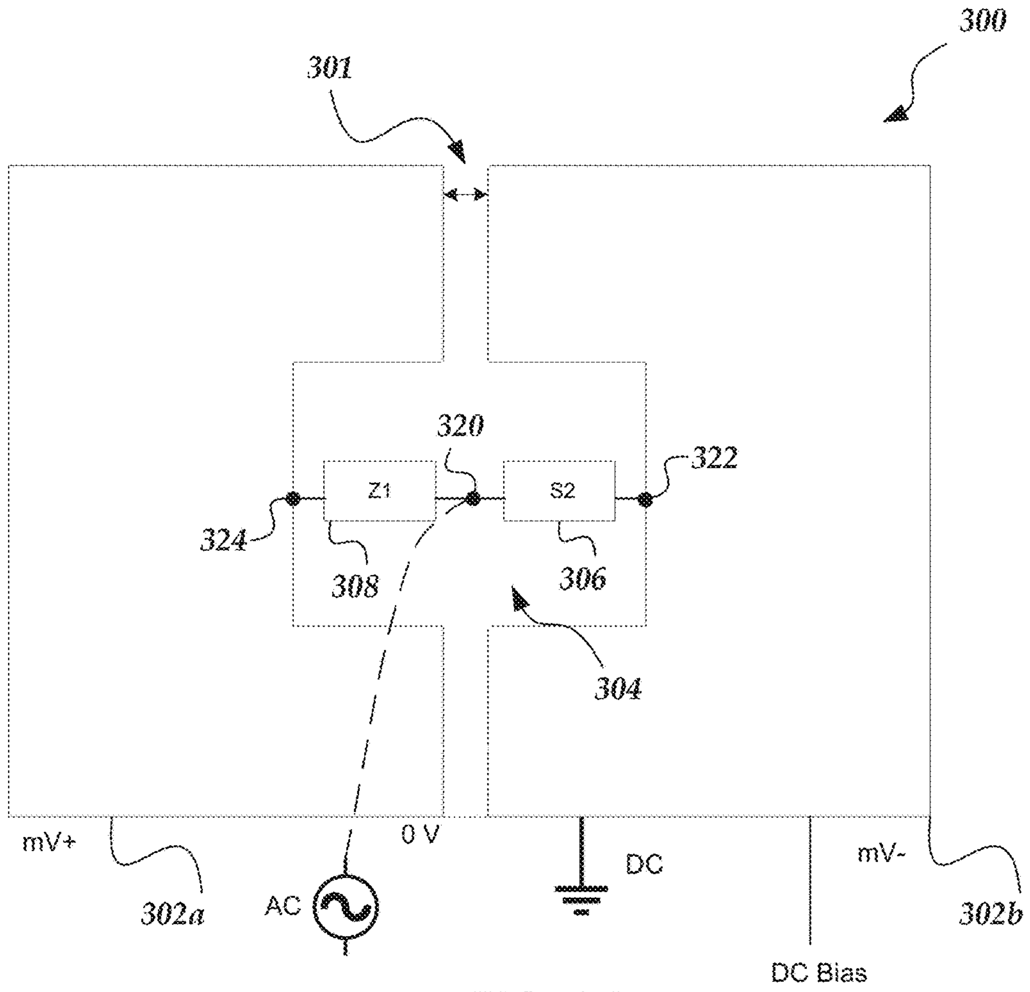
FIG. 3A illustrates a schematic top view of an exemplary switchable patch antenna that is arranged with a gap to provide a dipole mode of radiation, wherein a first component provides a fixed impedance value Z1 and a second component includes a switch S2 that provides a variable impedance value that is either substantially equivalent to fixed impedance value Z1 when switch S2 is conducting (closed) or the variable impedance value is substantially greater (infinity) than the fixed impedance value Z1 when the switch is non-conducting (open)

FIG. 3A illustrates a schematic top view of an exemplary switchable patch antenna that is arranged with gap 301 between regions 302*a* and 302*b* to provide a dipole mode of radiation. First component 308 provides a fixed impedance value Z1. Also, first component 308 is coupled between terminal 320 positioned in the center of a planar conductor that is formed by region 302*a* and region 302*b* and further coupled to terminal 324 on an edge of a region 302*a* that opens to aperture 304. Second component 306 includes a switch S2 that provides a variable impedance value that is either substantially equivalent to fixed impedance value Z1 when switch S2 is conducting (closed) or the variable impedance value is substantially greater (infinity) than the fixed impedance value Z1 when the switch is non-conducting (open). Further, second component 306 is coupled between center terminal 320 and terminal 322 on an edge of a region 302*b* that opens to aperture 304. Also, AC signal source is coupled to center terminal 320 and a DC bias circuit is coupled to region 302*b*. The generalized operation of switchable patch antenna 300 in the dipole mode is substantially similar to the switchable patch antenna 200 in the monopole mode as shown in FIG. 2E. Additionally, in one or more embodiments, a width of non-conductive gap 301 is minimized to optimize a dipole mode of radiation for the signal. Also, a DC ground is coupled to region 302*b*.

Figure 3B:
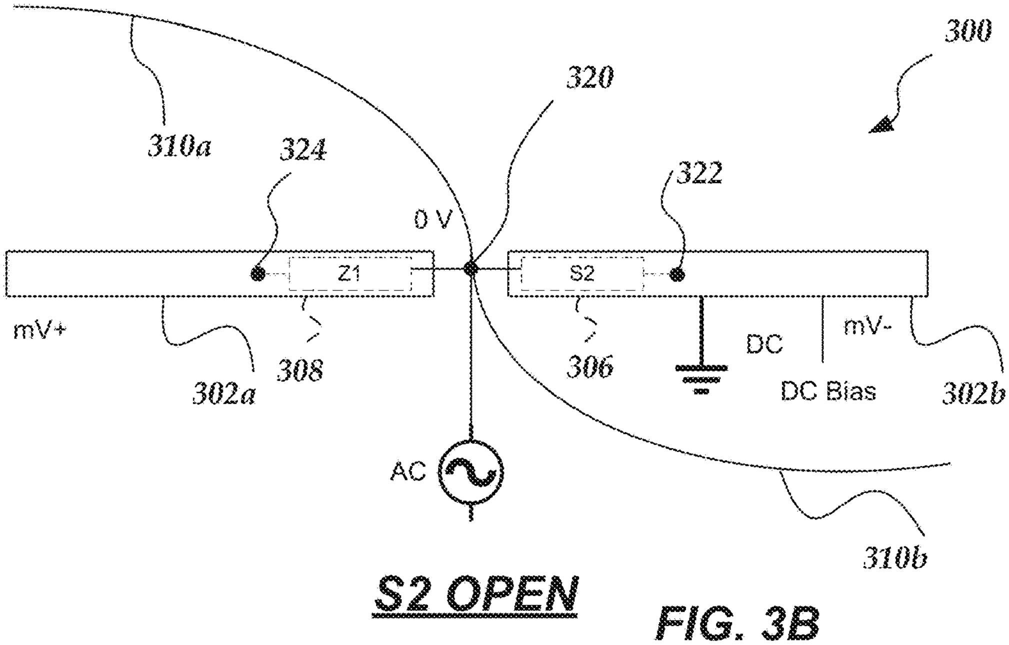
FIG. 3B shows a schematic side view of an exemplary switchable patch antenna that is arranged in a dipole mode of radiation, wherein a variable impedance value of the of the second component is substantially greater (infinity) than a fixed impedance value Z1 of the first component when switch S2 is non-conducting (open) so that a signal is radiated by the antenna.

FIG. 3B illustrates an exemplary schematic side view of switchable patch antenna 300 operating in a dipole mode when switch S2, of second component 306, is non-conducting (open). As shown, a signal is provided by a signal source to center terminal 320. The signal's peak positive waveform 310*a* and peak negative waveform 310*b* are shown at parallel and opposing edges of first region 302*a* and second region 302*b*. The signal's waveform oscillates between the opposing edges based on a particular frequency, such as microwave or radio frequencies. Also, a DC ground is coupled to region 302*b*.

Figure 3C:
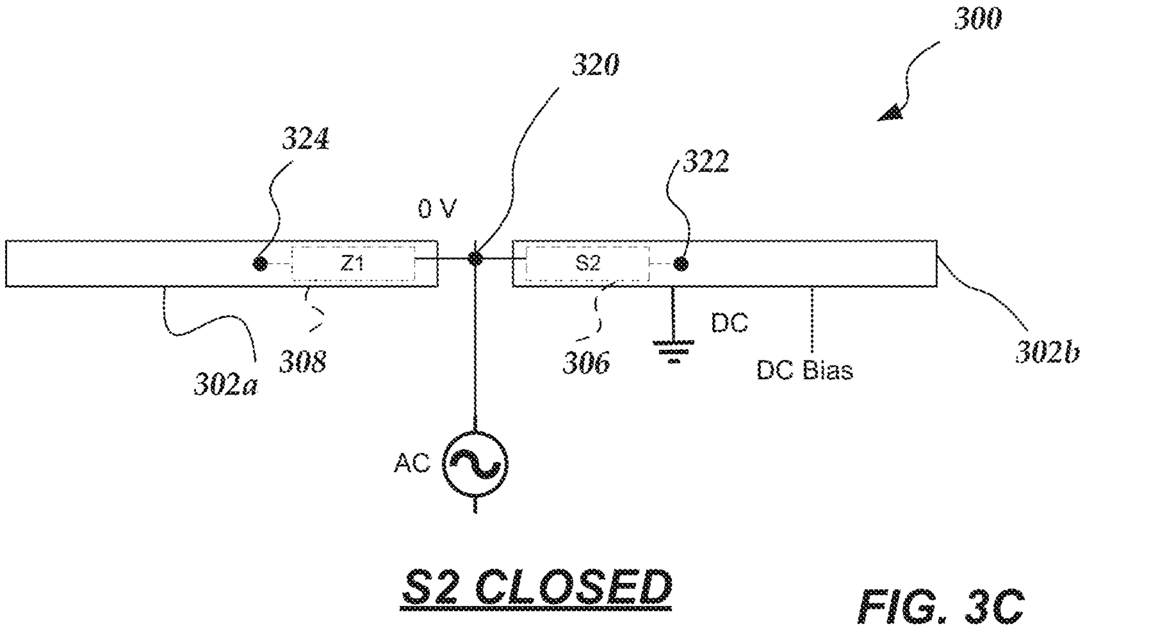
FIG. 3C illustrates a schematic side view of an exemplary switchable patch antenna that is arranged in a dipole mode of radiation, wherein the switch S2 is conducting (closed) and the variable impedance value of the second component is substantially equal to a fixed impedance value Z1 of the first component so that no signal is radiated by the antenna.
Figure 3D:
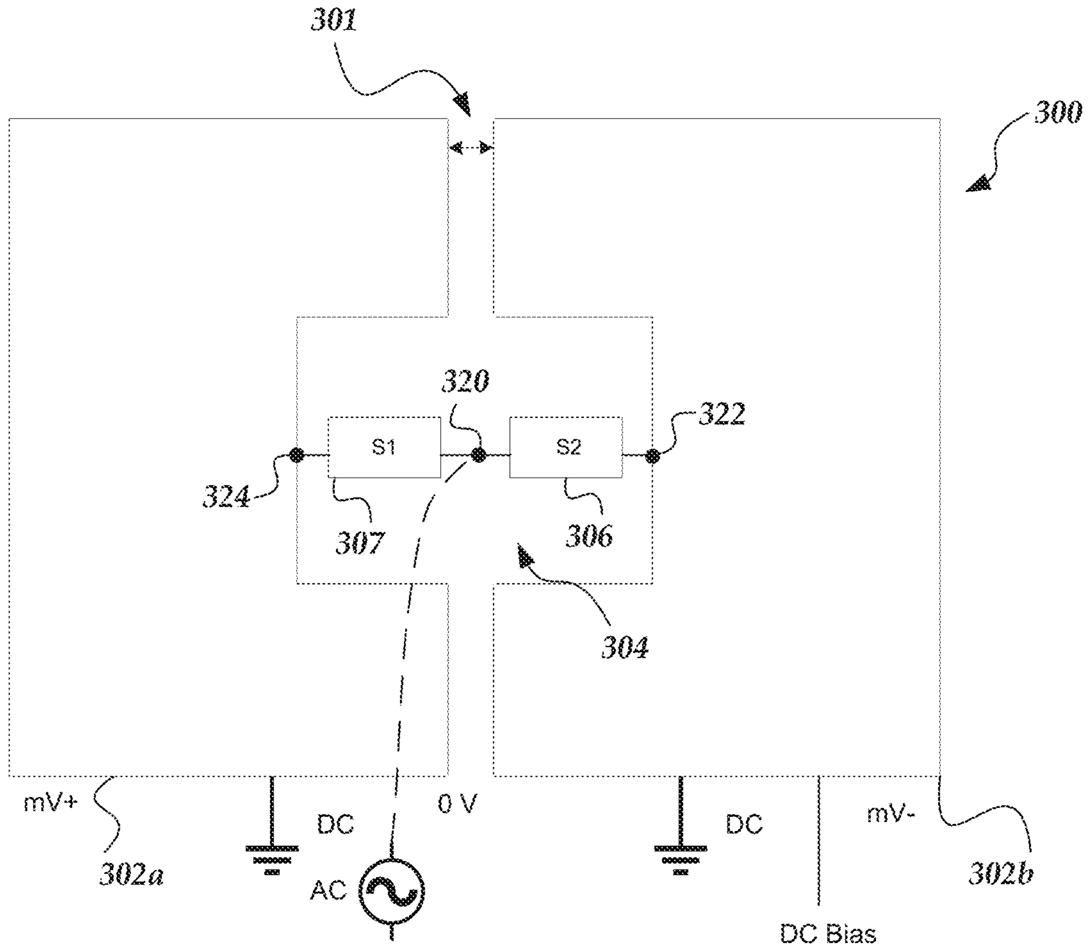
FIG. 3D shows a schematic top view of an exemplary switchable patch antenna that is arranged with a gap in a dipole mode of radiation, wherein a first component includes a switch S1 that provides a variable impedance value and a second component includes a switch S2 that provides a variable impedance value, wherein the variable impedance values of switch S1 and switch S2 are substantially equivalent when they are both conducting (closed), and wherein the variable impedance value of either switch that is non-conducting (open) is substantially greater than the variable impedance value of the other switch that is conducting (closed)

FIG. 3C illustrates a schematic side view of an exemplary switchable patch antenna 300 that is arranged in a dipole mode of radiation, when switch S2, of second component 306, is conducting (closed) and the variable impedance value of the second component is substantially equal to a fixed impedance value Z1 of first component 308. Also, a DC ground is coupled to region 302*b*. As shown, conduction of switch S2 effectively stops radiation of the provided signal or any other mutually coupled signals provided by other antennas or resonant structures.

Figure 4:
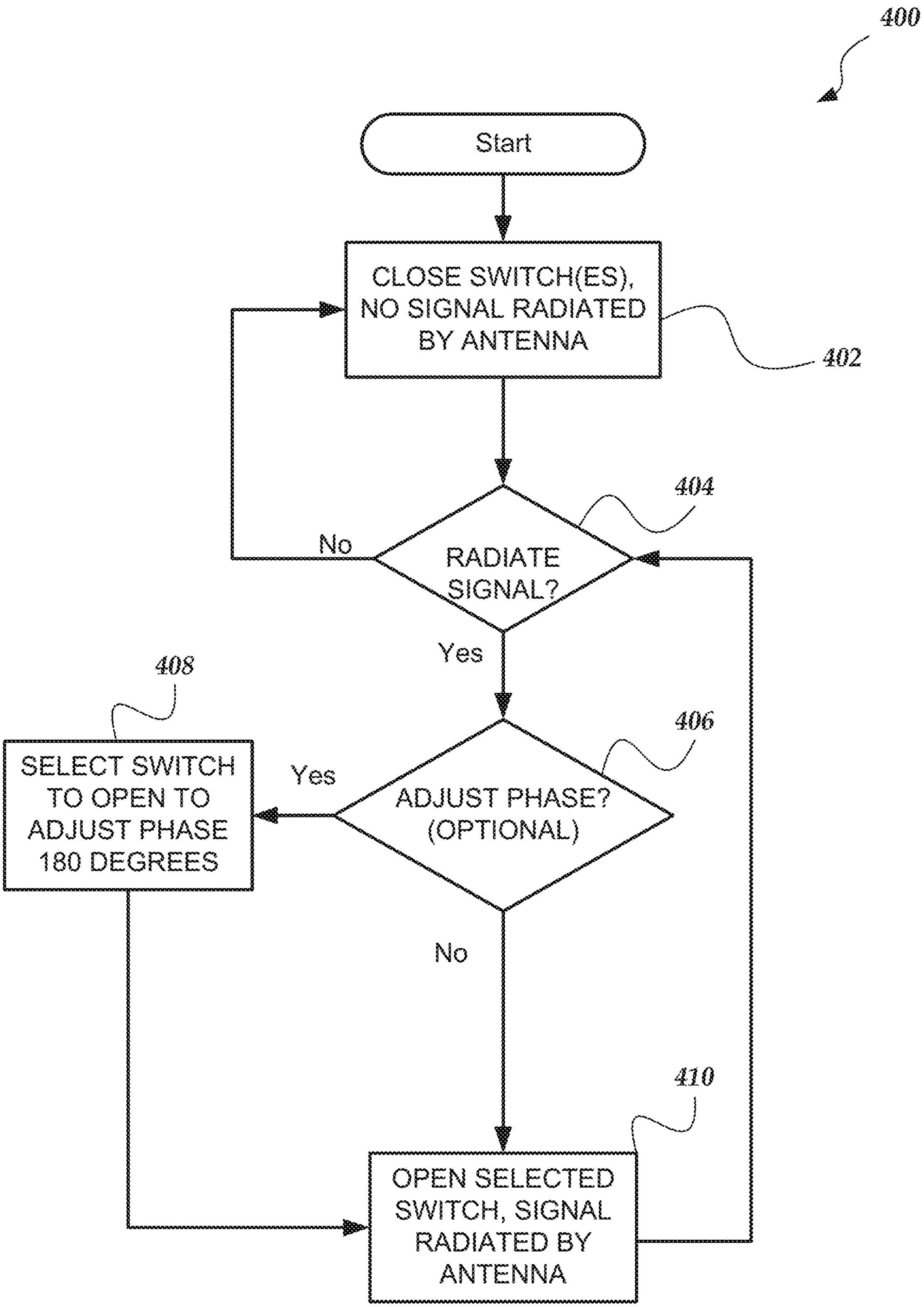
FIG. 4 illustrates a flow chart showing the operation of a switchable patch antenna.

FIG. 3D shows a schematic top view of an exemplary switchable patch antenna that is arranged with a gap in a dipole mode of radiation. First component 307 includes switch S1 that provides a variable impedance value and second component 308 includes switch S2 that provides another variable impedance value. The variable impedance values of switch S1 and switch S2 are substantially equivalent when they are both conducting (closed). Also, the variable impedance value of either switch (S1 or S2) that is non-conducting (open) is substantially greater than the variable impedance value of the other switch (S1 or S2) that is conducting (closed). In this way, a phase angle of the sinusoidal signal radiated by switchable patch antenna 300 may be changed 180 degrees depending upon which of switch S1 or switch S2 are conducting or non-conducting. As shown in FIGS. 2C and 2D, and the corresponding text. Also, a DC ground is coupled to both region 302*a* and region 302*b*. FIG. 4 shows a flow chart for method 400 for operating a switchable patch antenna. Moving from a start block, the process advances to block 402 where a switched component of the antenna is placed in a conductive (closed state) to provide a variable impedance value that is substantially equivalent to a fixed impedance value or a variable impedance value of another component. So long as the switch remains in the conductive state, the antenna will not radiate any provided signal or mutually couple another signal. At decision block 404, a determination is made as to whether to employ the antenna to radiate a signal's waveform. If no, the process loops back to block 402. However, if the determination is yes, the process optionally moves to decision block 406 where a determination is made as to wherein a phase angle of the provided signal should be shifted 180 degrees. If true, the process moves to block 410, where a switched component is selected to provide the phase shift. Next, the process moves to block 410. Also, if the optional determination at decision block 406 was false, the process would have moved directly to block 410, where a selected switched component is placed in a non-conductive state (open) to provide a variable impedance that is substantially greater than a fixed impedance value or a variable impedance value of another component. The signal is radiated by the antenna and the process loops back to decision block 404 and performs substantially the same actions.

Figure 5:
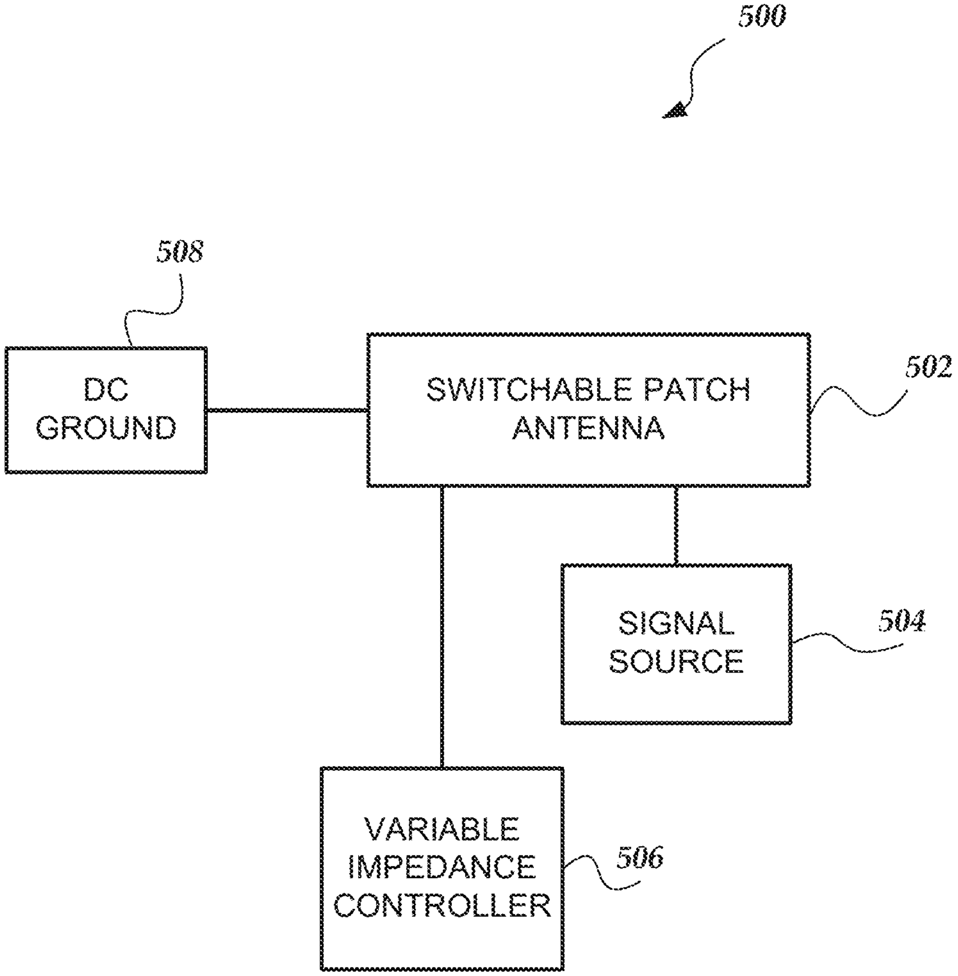
FIG. 5 shows a schematic of an apparatus for controlling the radiation of a signal by a switchable patch antenna in accordance with the one or more embodiments of the invention.

FIG. 5 shows a schematic illustration of an exemplary apparatus 500 that is employed to operate switchable patch antenna 502. Variable impedance controller 506 is employed to control a conductive and non-conductive state of a switched component included with switchable patch antenna 502 (not shown) that disables or enables radiation of a provided signal by the antenna. The signal is provided by signal source 504. Also, DC ground 508 is coupled to switchable patch antenna 502.

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. An apparatus, comprising:

a planar conductor having an opening;

a first impedance component located in the opening and coupled between a first portion and a second portion of the planar conductor;

a second impedance component located in the opening and coupled between the first portion and a third portion of the planar conductor; and wherein configuration of a first value of the first impedance component to be different than a second value of the second impedance component causes radiation of a signal applied to the first portion of the planar conductor.

2. The apparatus of claim 1, wherein the first portion of the planar conductor, further comprises a terminal located in a middle portion of the planar conductor's opening.

3. The apparatus of claim 1, further comprising:

preventing radiation of the signal by configuring the first value of the first impedance component to be equivalent to the second value of the second impedance component.

4. The apparatus of claim 1, further comprising:

configuring one or more of the first value or the second value to be equivalent to each other to prevent radiation of the signal; and configuring one or more of the first value or the second value to be different from each other to cause radiation of the signal.

5. The apparatus of claim 1, further comprising:

a non-equivalence configuration between the first value or the second value that is greater than the other and is arranged to cause a 180 degree phase shift for the radiated signal.

6. The apparatus of claim 1, further comprising:

a direct current (DC) ground coupled to the planar conductor to improve one or more patterns for radiation of the signal.

7. The apparatus of claim 1, further comprising:

a non-conductive area disposed between opposing edges of a first planar region and a second planar region of the planar conductor, and wherein a width of the non-conductive area is configured to cause a dipole mode for the radiation of the signal.

8. The apparatus of claim 1, further comprising:

a plurality of planar conductors that are arranged as patch antennas for a wireless communication device.

9. The apparatus of claim 8, wherein the plurality of planar conductors, further comprise:

a holographic metasurface antenna (HMA) that is configured to employ the plurality of patch antennas for radiation of the signal.

10. The apparatus of claim 1, wherein the opening further comprises a multi-dimensional shape that includes one or more elements that are rectangular, square, triangular, circular, spherical, rounded, curved, elliptical, quadrilateral, polygon, scattered, or random.

11. A system, comprising:

an antenna, including:

a planar conductor having an opening;

a first impedance component located in the opening and coupled between a first portion and a second portion of the planar conductor;

a second impedance component located in the opening and coupled between the first portion and a third portion of the planar conductor; and a controller that performs actions, including:

configuring a first value of the first impedance component to be different than a second value of the second impedance component to cause radiation of a signal applied to the first portion of the planar conductor.

12. The system of claim 11, wherein the first portion of the planar conductor, further comprises a terminal located in a middle portion of the planar conductor's opening.

13. The system of claim 11, wherein the controller performs further actions comprising:

preventing radiation of the signal by configuring the first value of the first impedance component to be equivalent to the second value of the second impedance component.

14. The system of claim 11, wherein the controller performs further actions further comprising:

configuring one or more of the first value or the second value to be equivalent to each other to prevent radiation of the signal; and configuring one or more of the first value or the second value to be different from each other to cause radiation of the signal.

15. The system of claim 11, wherein the controller performs further actions comprising:

employing a non-equivalence configuration between the first value or the second value that is greater than the other to cause a 180 degree phase shift for the radiated signal.

16. The system of claim 11, further comprising:

a direct current (DC) ground that is coupled to the planar conductor to improve one or more patterns for radiation of the signal.

17. The system of claim 11, further comprising:

a non-conductive area disposed between opposing edges of a first planar region and a second planar region of the planar conductor, and wherein a width of the non-conductive area is configured to cause a dipole mode for the radiation of the signal.

18. The system of claim 11, further comprising:

a plurality of antennas that are arranged as patch antennas for a wireless communication device, wherein the plurality of patch antennas is configured as a holographic metasurface antenna (HMA) for radiation of the signal.

19. A processor readable non-transitory storage media that includes instructions, wherein execution of the instructions by one or more processors causes performance of actions for controlling radiation of a signal, comprising:

employing a planar conductor having an opening to radiate the signal, wherein a first impedance component is located in the opening and coupled between a first portion and a second portion of the planar conductor, and wherein a second impedance component is located in the opening and coupled between the first portion and a third portion of the planar conductor; and employing configuration of a first value of the first impedance component to be different than a second value of the second impedance component to cause radiation of the signal applied to the first portion of the planar conductor.

20. The processor readable non-transitory storage media of claim 19, further causes performance of actions comprising:

configuring one or more of the first value or the second value to be equivalent to each other to prevent radiation of the signal; and configuring one or more of the first value or the second value to be different from each other to cause radiation of the signal.

* * * * *